United States Patent
Champ et al.

(10) Patent No.: US 6,189,407 B1
(45) Date of Patent: *Feb. 20, 2001

(54) EXPANDING LOCK CONTROL CABLE END FITTING

(75) Inventors: Larry Champ, Cairo; Jeffrey E. Tayon; Peter C. Koenig, both of Moberly, all of MO (US)

(73) Assignee: Dura AutomotiveSystems, Inc., Rochester Hills, MI (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/946,925

(22) Filed: Oct. 8, 1997

Related U.S. Application Data

(63) Continuation-in-part of application No. 08/728,060, filed on Oct. 9, 1996, now abandoned.

(51) Int. Cl.$^7$ ..................................................... F16C 1/10
(52) U.S. Cl. ................. 74/502.4; 74/502.6; 74/501.5 R; 248/61; 248/49
(58) Field of Search ................................ 74/502.4, 502.6, 74/500.5, 501.5 R; 403/329, 330, 252, 197; 248/49–61

(56) References Cited

U.S. PATENT DOCUMENTS

| | | | |
|---|---|---|---|
| 2,937,834 | 5/1960 | Orenick et al. ........................ 248/71 |
| 3,164,054 | 1/1965 | Biesecker ................................ 85/8.8 |
| 3,285,551 | 11/1966 | Tschanz ................................ 248/56 |
| 3,427,894 | 2/1969 | Tschanz ............................. 74/502.4 |
| 3,788,655 | 1/1974 | Hathaway . | |
| 3,875,843 | 4/1975 | Maeda et al. . | |
| 4,261,221 | 4/1981 | Kobayashi . | |
| 4,304,148 | 12/1981 | Hamman . | |
| 4,304,149 | 12/1981 | Heimann . | |
| 4,324,503 | 4/1982 | Sevrence . | |
| 4,333,361 | 6/1982 | Spease . | |
| 4,657,212 | 4/1987 | Gilmore et al. . | |
| 4,773,280 | 9/1988 | Baumgarten . | |
| 4,963,050 | 10/1990 | Wendt et al. . | |
| 5,257,548 | 11/1993 | Pardy . | |
| 5,582,074 | 12/1996 | Kelley et al. ........................ 74/502.4 |
| 5,613,405 | 3/1997 | Kelley et al. ............... 74/501.5 R X |
| 5,653,147 | 8/1997 | Kelley et al. ........................ 74/502.4 |
| 5,662,004 | 9/1997 | Osborn et al. ...................... 74/502.4 |
| 5,682,796 | 11/1997 | Malone .............................. 74/502.4 |
| 5,699,697 | 12/1997 | Petruccello et al. ................ 74/502.6 |

FOREIGN PATENT DOCUMENTS

| | | | |
|---|---|---|---|
| 2 314 598 | 10/1973 | (DE) . | |
| 0086717 | 8/1983 | (EP) ................................... 74/502.4 |
| 2408173 | 6/1979 | (FR) ................................... 74/502.4 |
| 2 532 381 | 3/1984 | (FR) . | |
| 790819 | 2/1958 | (GB) . | |
| 2081411 | 2/1982 | (GB) . | |

Primary Examiner—Vinh T. Luong
(74) Attorney, Agent, or Firm—Porter, Wright, Morris & Arthur

(57) ABSTRACT

A two-piece expanding lock control cable end fitting for connecting a co-axial cable assembly with a support structure. The first piece is a sleeve that is attached, typically by crimping, to the conduit member. The second part is a lock clip member. The lock clip member includes a base flange, a cylindrical portion and an inclined portion. During assembly the base flange on the clip member will contact the mating part and prevent the clip member from traveling through the mating part. The mating part could be a backing plate, a frame member, or brake lever component. When the clip member stops traveling through the mating part, the sleeve continues to move through the clip member. The end of the sleeve contacts the inclined portion of the clip member causing the clip member to expand. When the sleeve it is fully seated in the clip member, a locking feature on the clip member engages the sleeve to prevent removal of the sleeve from the clip member.

15 Claims, 27 Drawing Sheets

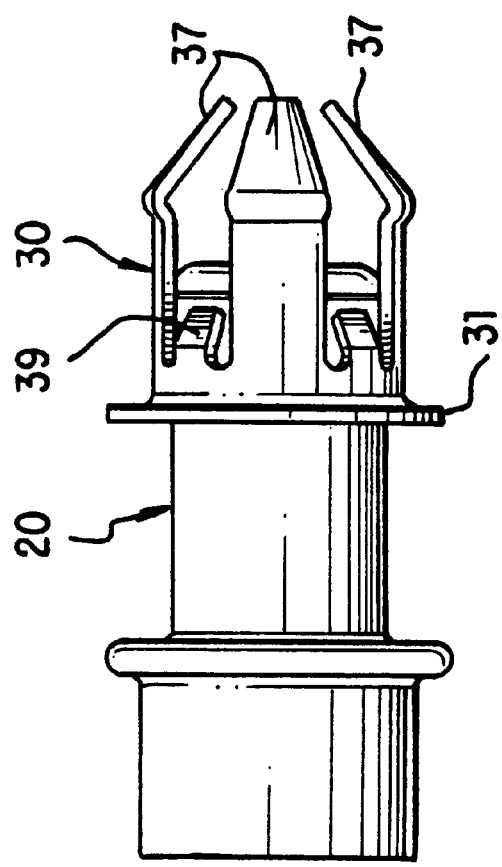
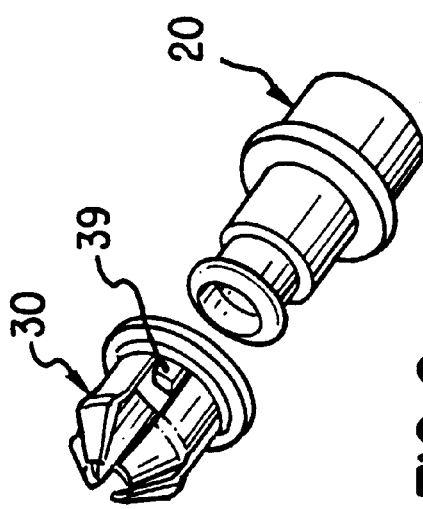
FIG. 2A
FIG. 2

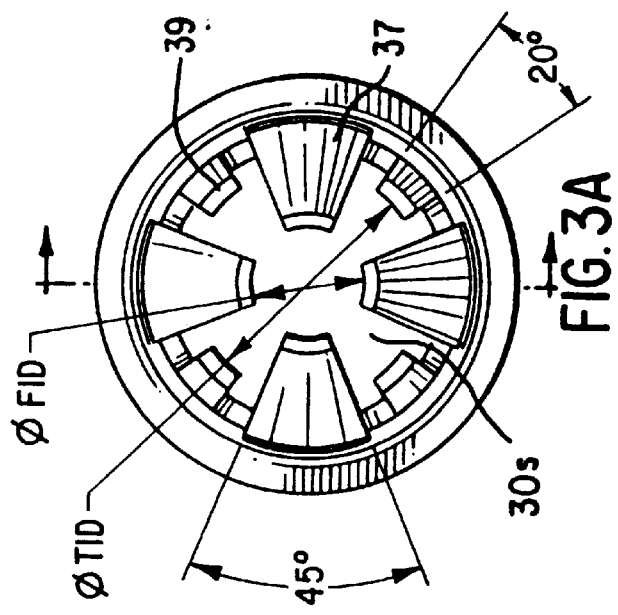
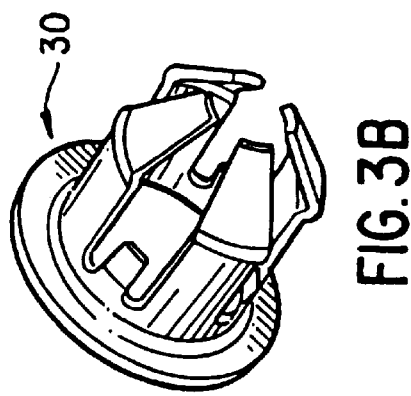
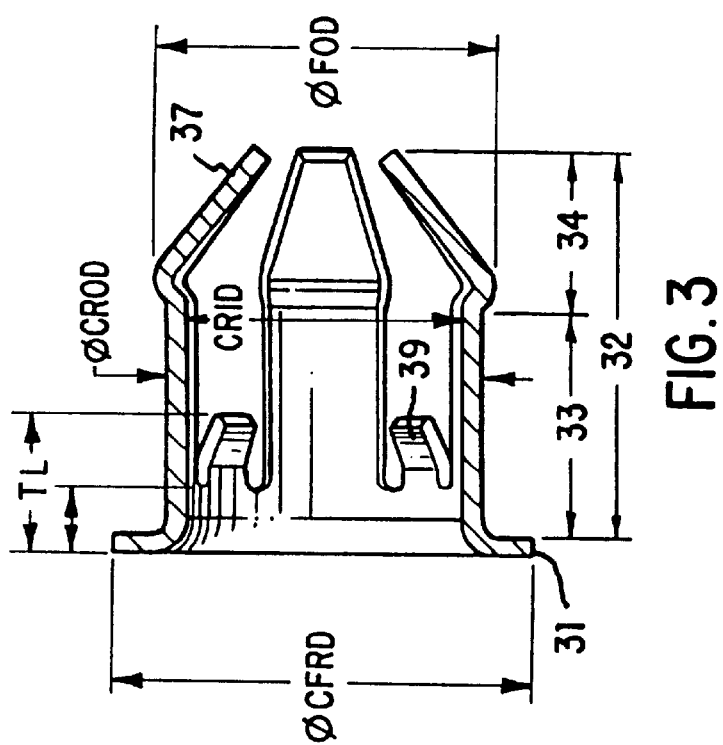
FIG. 3A
FIG. 3B
FIG. 3

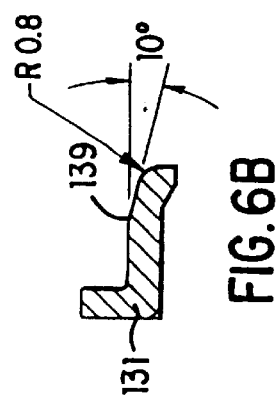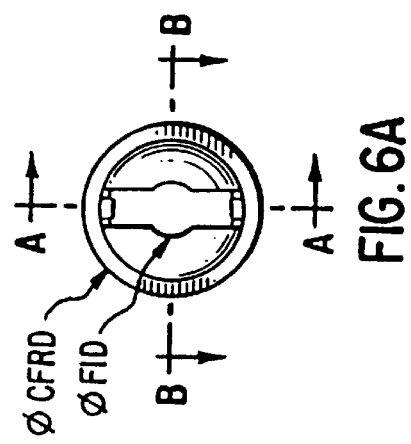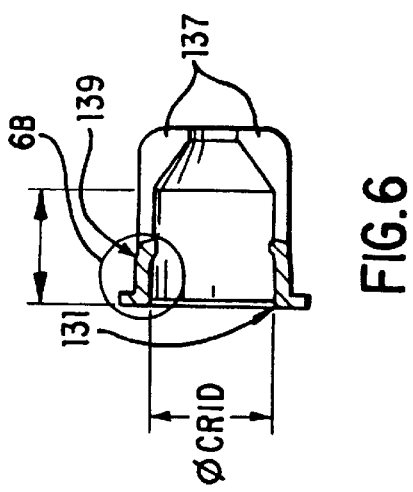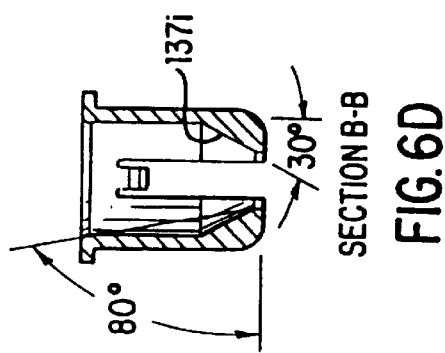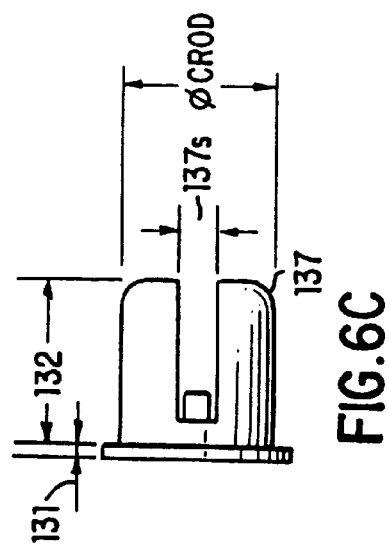

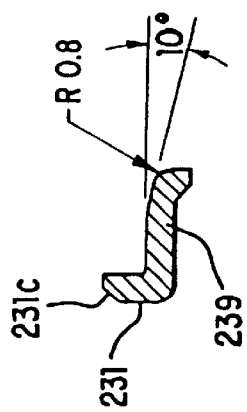
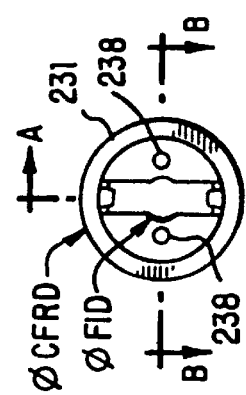
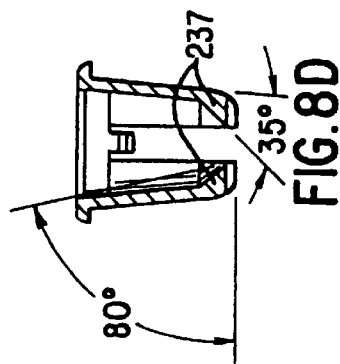
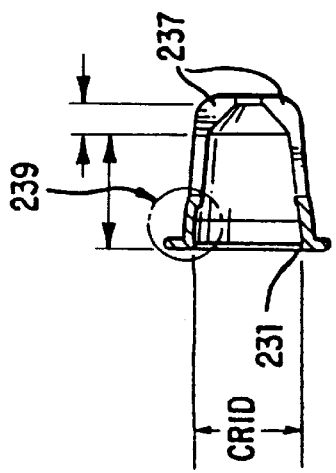
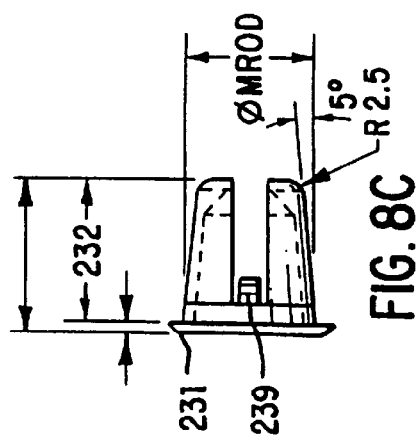

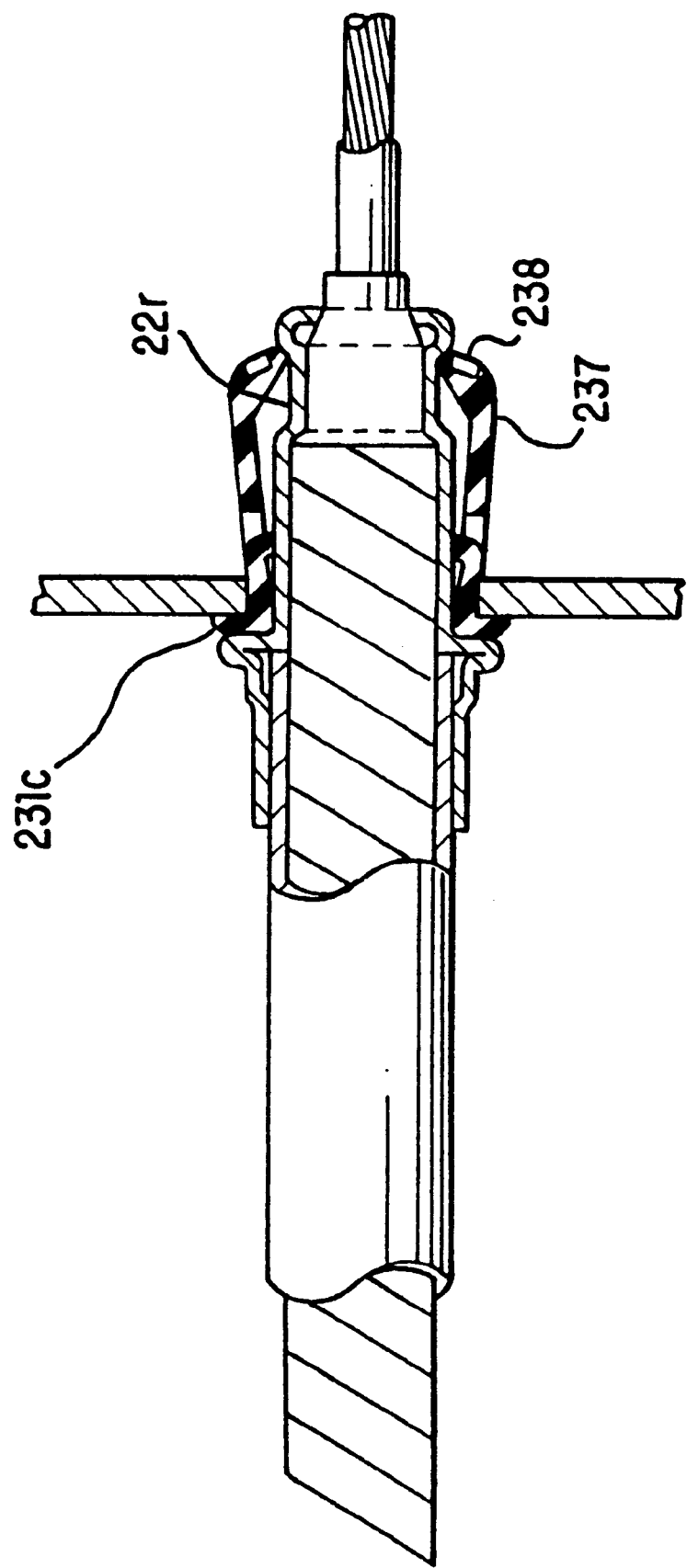

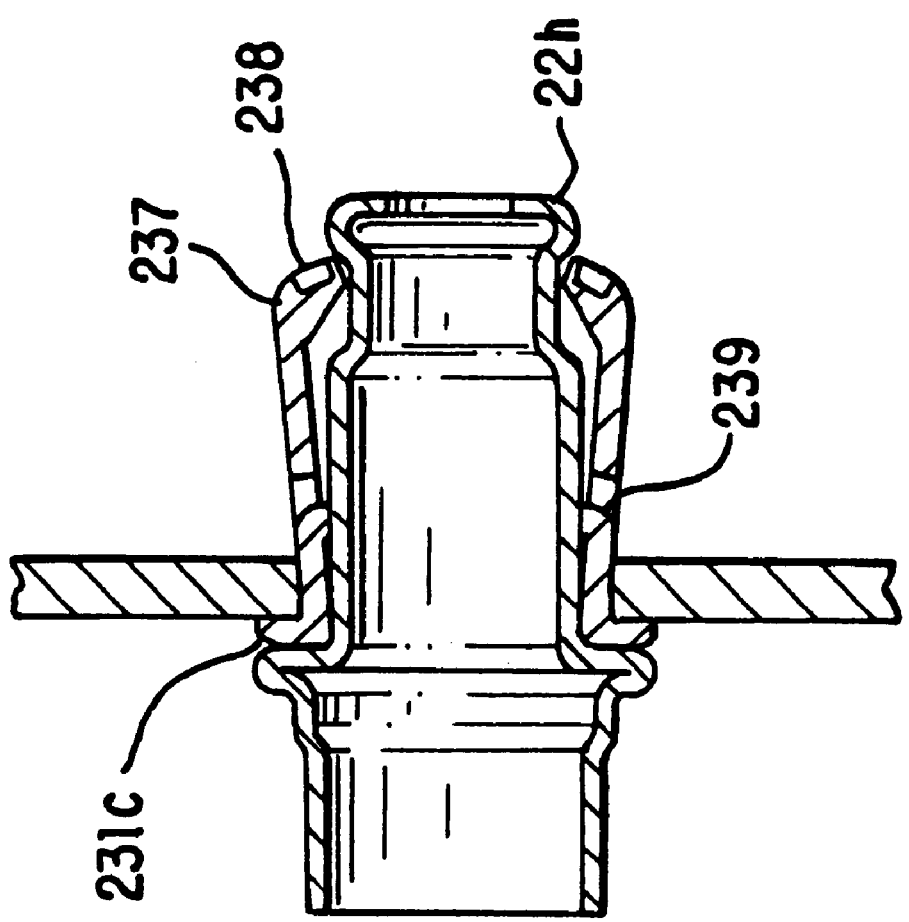

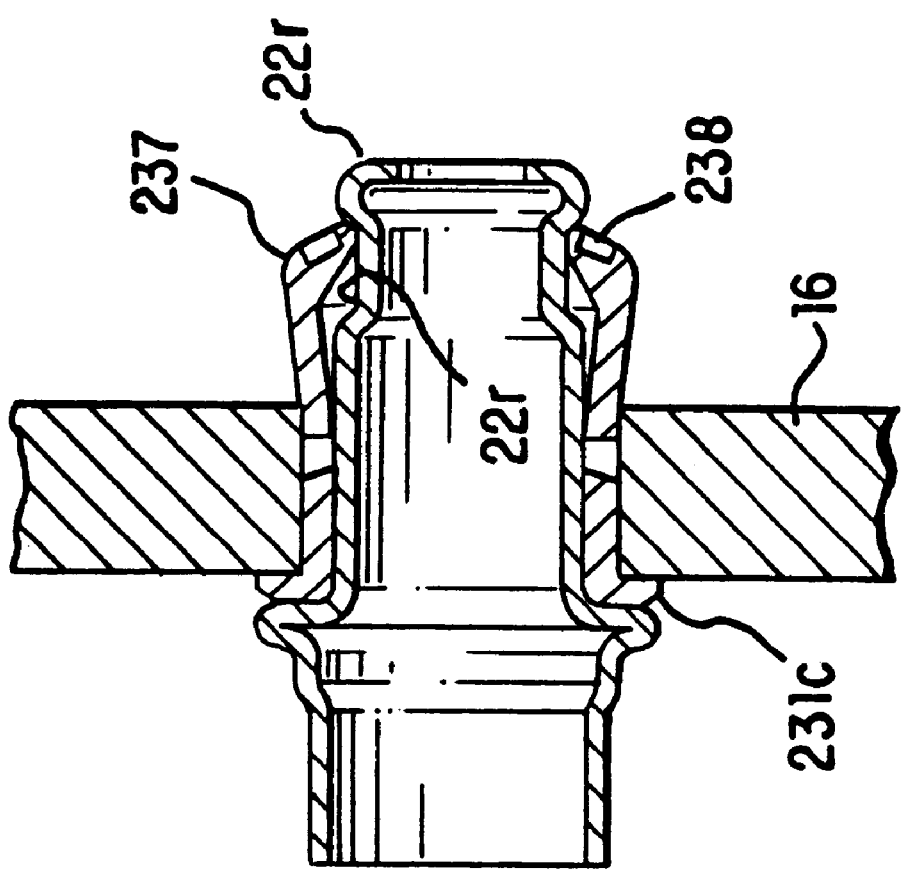

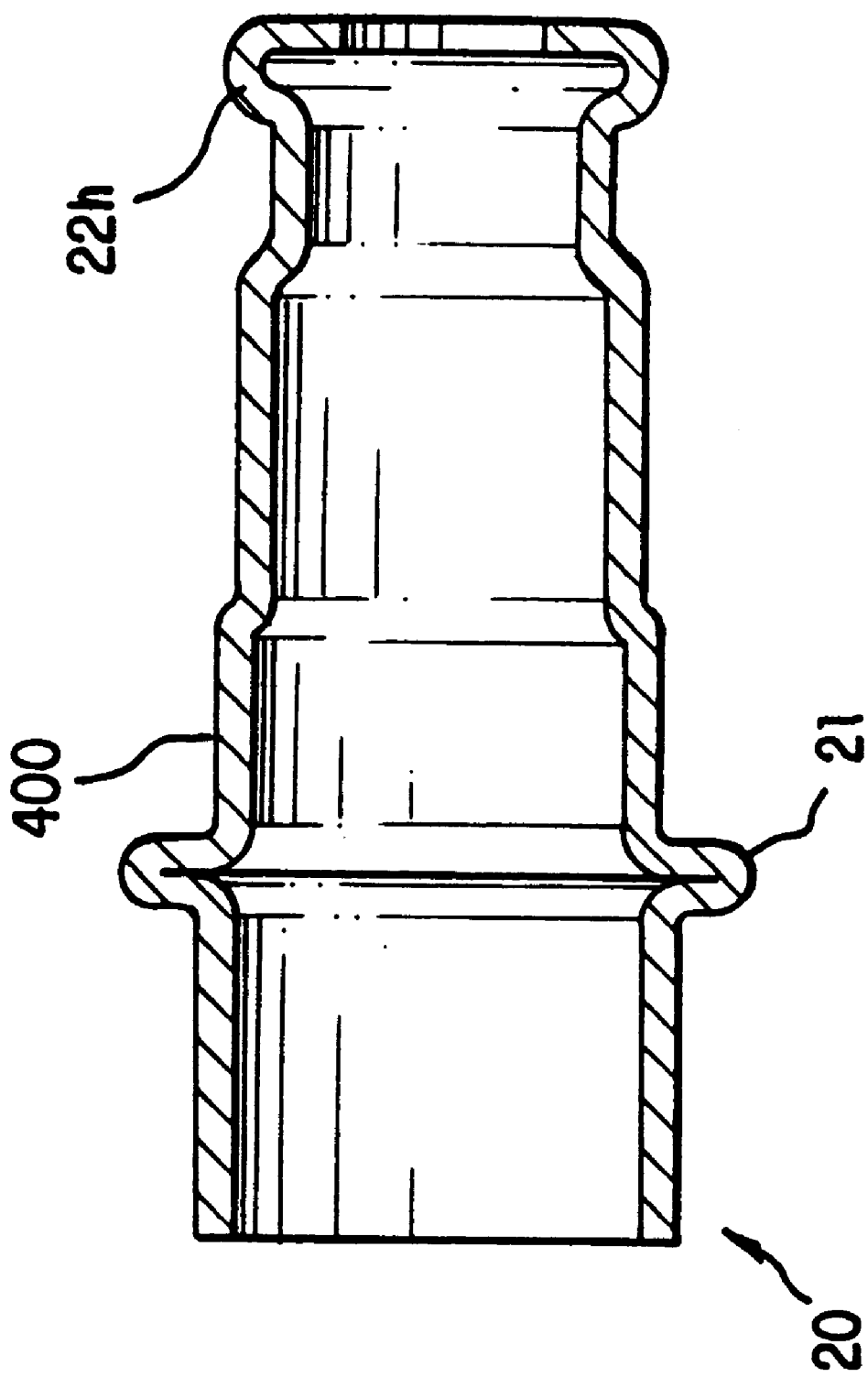

EXPANDING LOCK CONTROL CABLE END FITTING

This application is a continuation-in-part of applicant's corresponding application of the same title having U.S. Ser. No. 08/728,060 filed Oct. 9, 1996 now abandoned.

FIELD OF THE INVENTION

The present invention relates to a cable anchoring assembly, and more particularly to an expanding lock control cable end fitting for mounting the conduit member of a coaxial control cable assembly, such as, for example, an automotive brake cable assembly, within a support member (which may be a housing wall, bracket, or other similar anchor structure).

BACKGROUND ART

Conduit end fittings have been used for many years to anchor the conduit member of a coaxial control cable assembly to a support member. Early devices typically exhibited certain operational or assembly problems. One example of an early prior art device is the assembly disclosed in the Bratz U.S. Pat. No. 2,869,905. The fitting described therein was fabricated from a single blank of metal stock. To provide the fitting with a sufficient conduit compression load resistance, the struck-out portions or tabs had to be relatively thick, and consequently, the metal stock material from which the tabs were formed had to have a relatively large thickness dimension. As a consequence, the resilient prongs of the fitting, which were fabricated from the same metal stock material, were also thick and the flexibility of the prong members was limited. Because of the limited flexibility of the prong members it was difficult to depress the prong members without utilizing special installation tools.

To overcome the disadvantages of the Bratz device, a multi-component conduit anchorage device or fitting was employed so that the required thickness of the tab members did not dictate the thickness of the prong members. One early device of this type is described in U.S. Pat. No. 3,366,405 to Sevrence. The depressible prongs of this device are integrally fabricated from a relatively thin tubular spring clip or anchor member, however, the remaining structure of the clip or anchor member and the corresponding interrelated structure of the main body member of the fitting with which the clip or anchor member operatively cooperates is relatively complex, which renders such fittings expensive to manufacture. Consequently, such devices are not economically practical.

Still other prior art cable anchoring assemblies are exemplified by the assemblies disclosed in U.S. Pat. No. 3,415,549 to Chatham and U.S. Pat. No. 3,221,572 to Swick. While these assemblies are also of the multi-component type, such assemblies, like those of Sevrence and Bratz, are relatively expensive to manufacture, and the installation operation is relatively difficult to perform and quite time-consuming to accomplish. This is due to the fact that in assembling the fittings of Chatham and Swick, various auxiliary operations must be performed upon the various components of the fittings, such as, for example, swaging, beading, welding, or the like.

Of course, other forms of clamps are known in other fields. For example, U.S. Pat. No. 2,514,504 to Moline discloses a pipe clamp that includes an inner flanged sleeve and an outer sleeve that includes tapered fingers. The connection is said to be sufficiently secure that train vibrations and sudden impact will not adversely affect the connection. While this connection might have been acceptable for pipes, the connection is not readily adaptable to control cable end fittings. To begin with, the clamp is specifically designed to permit slight pipe displacement with respect to the mounting plate. To this end, the first cylindrical member is movable longitudinally along the pipe. In addition, the first cylindrical member includes at least two longitudinal slots that allow the diameter of the cylindrical member to be reduced under pressure. Moreover, the Moline clamp relies on driving one element to force the two cylindrical members together and reduction of the diameter of the inner member to effect retention of the rings in the assembled position.

Other assemblies are described in U.S. Pat. No. 2,559,759 issued to DeSwart; U.S. Pat. No. 4,626,620 issued to Plyler; U.S. Pat. No. 4,981,310 issued to Belisaire; U.S. Pat. No. 2,424,757 issued to Klumpp and U.S. Pat. No. 3,427,894 issued to Tschanz. None of the designs disclosed in these patents is directly applicable to cable control end fittings and consequently none of these designs satisfy the special needs of such end fittings. Among other things, the designs do not contemplate capping the end of a conduit with zero lash, while still permitting the inner core to pass through the support wall.

U.S. Pat. No. 4,131,379 to Gordy addressed some of these problems by providing a three-piece self-retaining cable anchoring assembly that is quickly and easily mounted within an opening contained in a support member without the use of special installation tools. The device described by Gordy includes an inner sleeve member, an outer sleeve member concentrically arranged about the inner sleeve member, and a collar member concentrically arranged about the outer sleeve member. One end of the collar member abuts one side of the support, the other end of the collar member is supported against axial displacement by flange portions at the corresponding ends of the inner and outer sleeve members. The outer sleeve member includes a plurality of circumferentially arranged external resilient prongs that engage the other side of the support, which outer sleeve member is connected against axial displacement relative to the inner sleeve and collar members. Consequently, the collar flange and the outer sleeve prongs grip opposite surfaces of the support structure to rigidly connect the anchoring device thereto.

There remains, however, several disadvantages with current "spring clip" brake cable end fittings based on Gordy's original disclosure. To begin with, the tabs must be compressed during installation to the mating part since the spring tabs are expanded prior to installation. This requires a significant installation force.

In addition, there is no way to adjust a clip for different thicknesses of the mating parts. As a result, different parts must be used for different applications.

U.S. Pat. No. 5,653,147 to Kelley et al. addressed some of the problems from Gordy by providing for mounting of a two-piece flexible tubular conduit and a flexible core element using a retainer and collar assembly having cantilever legs attached to the conduit. This device is easily installed by pressing the collar assembly into a precut hole in a wall or bracket such that cantilever legs wedge outwardly against the hole and are retained by surfaces on the collar. The collar assembly and cantilever legs do not require compression during installation in the hole because legs expand over the collar assembly as the assembly is compressibly installed in the hole.

However, the design of Gordy does not address significant problems with the wide variety of installation surfaces that may call for use of a retaining device. These problems can include widely varying thicknesses of walls, for which the Kelley et al. device has a limited range of applicability, and problems with slippage of the Kelley et al. assembly after installation in a retaining wall or bracket. In addition, Kelley et al. describes only a two-piece assembly. The two-piece assembly presents additional difficulties since the cantilever legs assembly can become separated from the collar assembly. Further, a two-piece assembly requires two separate moldings or other fabrication processes, one for each piece.

Thus, there remains a need for an anchoring assembly that is inexpensive, easy to install and adaptable to support walls of significantly different thickness, while assuring minimal slippage or other movement of the installed device. It is the principal object of the present invention to provide an anchoring assembly that meets these needs. It is a further object of the present invention to provide various anchoring assembly embodiments that are particularly useful in the context of end fittings used in cable anchoring assemblies. It is a further object of the present invention to provide a device constructed of a single, frangible piece, facilitating assembly and fabrication.

SUMMARY OF THE INVENTION

The present invention provides an anchoring assembly that is inexpensive, easy to install and adaptable to support walls of significantly different thickness. In particular, the present invention provides an expanding lock control cable end fitting for anchoring a cable into an opening in a support member. In an embodiment of the present invention, the end fitting has two pieces: a clip member and a sleeve. In another embodiment, the end fitting is constructed of a single piece that may be frangibly separated into two pieces during anchoring.

The clip member preferable includes a flange portion that has a radial dimension that is greater than the radial dimension of the opening in the support member so that the flange of the clip member cannot pass through the opening in the support member. The clip also includes a body portion that extends from the flange portion along a longitudinal axis. The body portion of the clip member has a radial dimension that is less than the radial dimension of the opening in the support member so that the body of the clip member can pass through the opening in the support member.

A longitudinally extending opening is formed in the clip member. The longitudinally extending opening has a predetermined internal shape and extends through the flange portion into the body portion of the clip member. The sleeve member is adapted to slide into the longitudinally extending opening formed in the clip member.

The sleeve member includes a flange portion, a body portion and a tubular portion that is longitudinally fixed to the conduit. The flange portion has radial dimension that is greater than the radial dimension of the longitudinally extending opening formed in the clip member. The body portion caps the end of the conduit and has a radial dimension that is less than the radial dimension of the flange portion of the sleeve member. The body portion has an exterior shape that cooperates with the internal shape of the longitudinally extending opening formed in the clip member so that the sleeve can be inserted into the longitudinally extending opening formed in the clip member so that the clip is caused to expand radially outward so as to secure the clip member to the support. Preferably, the sleeve includes a recess portion located between the head end and the flange end of the cylindrical portion.

The longitudinally extending portion of the clip member is specially designed such that it is adaptable to a very wide range of support wall thicknesses. In particular, this design includes of clip member with a length in the longitudinally extending direction that is much greater than the width of the clip member. This feature allows greatly improved flexibility in fitting to a wall opening, which assures tight seating in both thin and thick wall applications.

In one embodiment, the clip member includes a cylindrical portion and an inclined portion. The inclined portion is inclined relative to the axis of the cylindrical portion of the sleeve such that when the head of the sleeve is moved toward the inclined portion, the end of the sleeve contacts the inclined portion of the clip member causing the clip member to expand.

Preferably, the inclined portion of the clip member comprises a plurality of inclined fingers that are inclined at an angle of at least 30° relative to the axis of the cylindrical portion of the sleeve. The clip member also preferable includes retaining tabs located between the fingers that are inclined inwardly into the recessed portion of the sleeve to maintain the clip member on the sleeve during shipping. The retaining tabs are deflected out of the recess when the sleeve is pushed into the clip member.

The clip member is preferable made of hard plastic to provide electrical isolation between the control cable and the mating part. This will reduce the galvanic corrosion. The clip member may, however, be made of metal.

In another embodiment, the clip includes a substantially cylindrical or slightly tapered outer surface and a flange. The inner surface of the clip member includes a cylindrical portion and an inclined portion. Both the cylindrical portion and inclined portion are split so as to define at least two fingers that each have an inclined inner surface. The inclined inner surface is arranged such that when the head of the sleeve is moved the toward the inclined portion, the end of the sleeve contacts the inclined portion of the clip member causing the clip member to expand.

In an embodiment of the present invention, the sleeve member includes a shoulder section such that extends from the tubular portion at a point between the head end and the flange of the sleeve. The shoulder section is arranged such that as the clip portion is moved past head of the sleeve toward the flange portion of the sleeve, the shoulder wedges the clip portion against the surface of the hole, tightening the seating of the assembly in the hole, and thus reducing slippage between the installed assembly and the hole. This shoulder section thus assures a tighter seating of the clip and sleeve assembly into a hole by providing a leverage point at the shoulder for the clip against the hole surface.

In another embodiment of the present invention, the sleeve member includes an inclined section of the tubular portion of the sleeve member between the head end and the flange end of the sleeve. Similar to the shoulder embodiment, this inclined tubular portion is arranged such that as the clip portion is moved past the head of the sleeve toward the flange portion of the sleeve, the inclined portion wedges the clip portion against the surface of the hole, tightening the seating of the assembly in the hole, and thus reducing slippage between the installed assembly and the hole.

Thus, it can be seen that the present invention provides a simple two-piece anchoring assembly that is easy to install and can adapt to support walls of widely different thicknesses.

Various alternative embodiments are possible as discussed in detail below. For example, the clip member can be formed in support member or could include means (crushed ribs or reversed tabs) for securing clip in support member. Holes, chamfers or other means can be provided for permitting use of a tool to remove the clip after installation. All of the embodiments can include retaining tabs or some other means, such as frangible elements to maintain the clip member in place during shipping. As an alternative to separate inclined fingers, the clip could have perforations or frangible portions that separate under pressure to allow radial expansion.

BRIEF DESCRIPTION OF THE DRAWINGS

Other objects and advantages of the invention will become apparent from a study of the following specification when viewed in the light of the accompanying drawings, in which:

FIG. 2 is a side view of another embodiment of the present invention;

FIG. 2A is a perspective view of the embodiment of FIG. 2;

FIG. 3 is a sectional view of the clip member of the end fitting of FIG. 2;

FIG. 3A is an end view of the clip member of FIG. 3;

FIG. 3B is a perspective view of the clip member of FIG. 3;

FIG. 6 is a side view, partially in section, of the clip member used in the embodiment of FIG. 5;

FIG. 6A is an end view of the clip member of FIG. 6;

FIG. 6B is a sectional view of the retaining tab of FIG. 6;

FIG. 6C is a top view of the clip member of FIG. 6;

FIG. 6D is a section view of the clip member of FIG. 6.

FIG. 8 is a side view, partially in section, of the clip member used in the embodiment of FIG. 7;

FIG. 8A is an end view of the clip member of FIG. 8;

FIG. 8B is a sectional view of the retaining tab of FIG. 8;

FIG. 8C is a top view of the clip member of FIG. 8;

FIG. 8D is a section view of the clip member of FIG. 8;

FIG. 9B is a sectional view showing the coaxial cable with end fitting of FIG. 9 fully installed into the thin mating part or support wall;

FIG. 11B is a sectional view showing the end fitting of FIG. 11 fully installed into the thin mating part or support wall;

FIG. 12B is a sectional view showing the end fitting of FIG. 12 fully installed into the thick mating part or support wall;

FIG. 16. is a sectional view showing an embodiment of the present invention in which the sleeve portion includes a shoulder portion for the tubular section of the sleeve.

DETAILED DESCRIPTION

Figure 9:
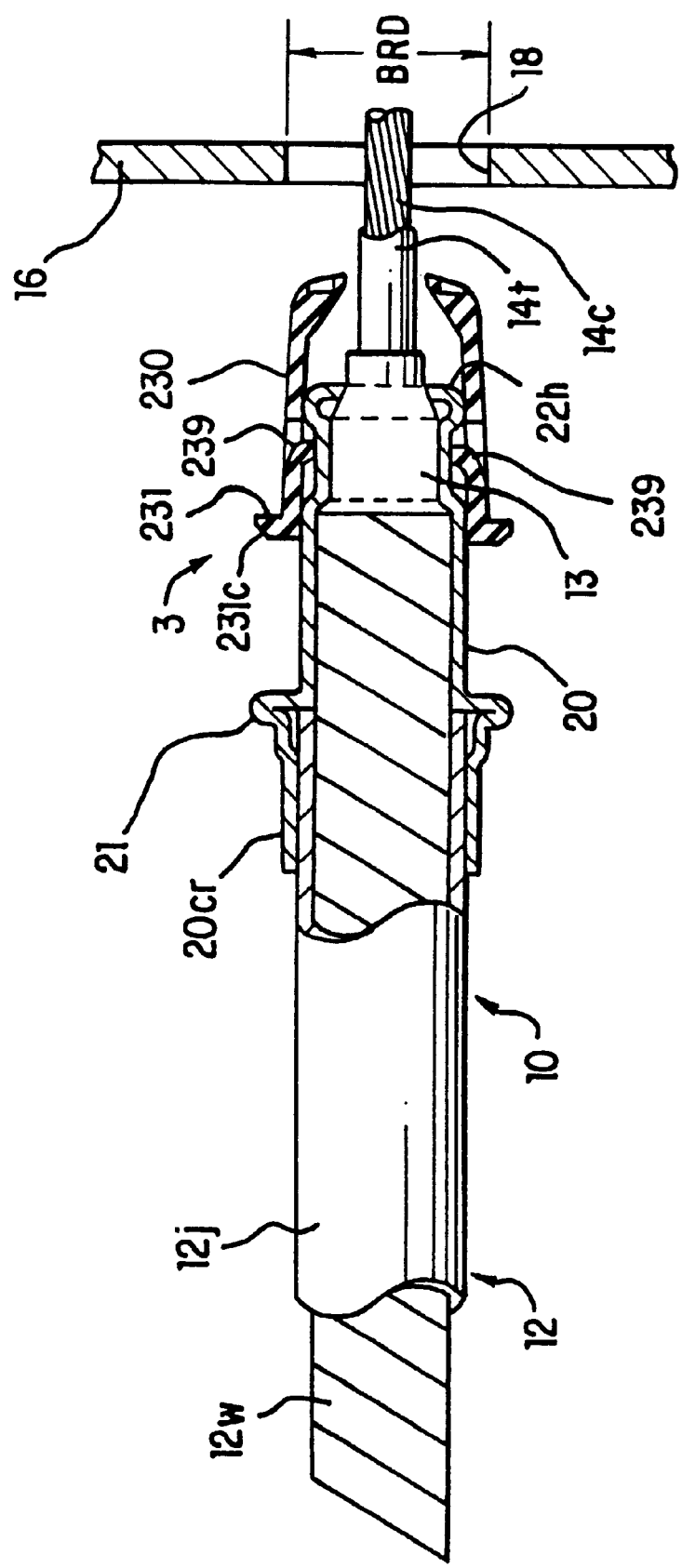
FIG. 9 is a sectional view showing a coaxial cable with end fitting as it is about to be inserted into a thin mating part or support wall.

To understand the environment in which the end fitting of the present invention is used, one should initially refer to FIG. 9. As shown therein, the end fitting 3 includes a sleeve member and a clip member that collectively secure the outer, tubular conduit member 12 of a coaxial control cable 10 within a through bore 18 provided in a support member 16. The control cable 10 may be, for example, an automotive brake cable, and the support member 16 may be, for example, a dashboard housing wall, bracket, or similar anchor structure on the vehicle. Typically, the cable 10 includes a conduit 12 and a strand 14.

As shown, the conduit 12 often includes a wire 12w wrapped helically in the form of a coil and a plastic jacket or sheath 12j covering the helical coil. The jacket is ordinarily formed of an organic polymeric material of the various known plastics such as polyethylene etc. The strand often includes a flexible metallic core element 14c and resinous plastic tube or strand coating 14t. The resinous plastic tube is disposed within and extends throughout the length of conduit coil so that the strand is restrained against over-all longitudinal movement relative to the coil, but free to accommodate the slight relative motion that occurs between adjacent turns of the coil when the casing is bent. The flexible metallic core element 14c extends through the plastic tube and is freely movable longitudinally therein.

End fittings are generally tubular in shape and have a capped end and an open end. The conduit terminates at the capped end and protrudes from the open end of the end fitting. The strand extends through the capped end of the end fitting. A seal 13 may be provided between the end of the conduit and the strand coating 14t in the proximity of the capped end of the end fitting. The conduit has an exterior surface and the conduit end fitting is crimped or bonded to that exterior surface so that there is no lash in the axial or longitudinal direction between the conduit and the sleeve.

The details of the end fittings of the present invention will now be described in greater detail, beginning with the embodiment of FIGS. 1–1B. The end fitting of FIGS. 1–1B consists of two pieces. One is a sleeve member 20 that is attached, typically by crimping, to the conduit member 12. The second part is a lock clip member 30.

Figure 4A:
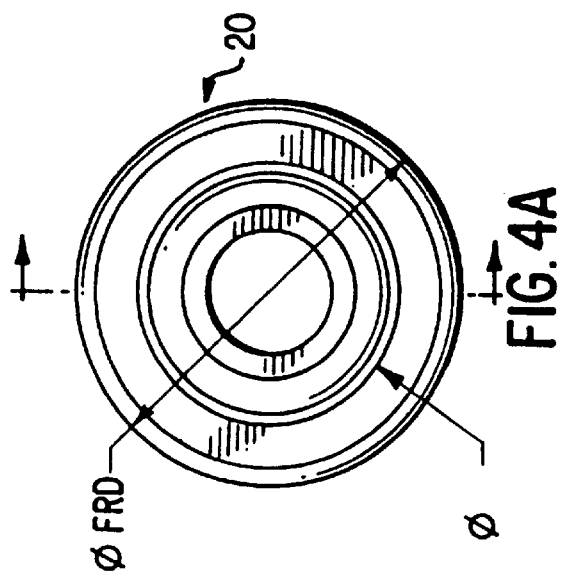
FIG. 4A is an end view of the sleeve portion as shown in FIG. 4.
Figure 4B:
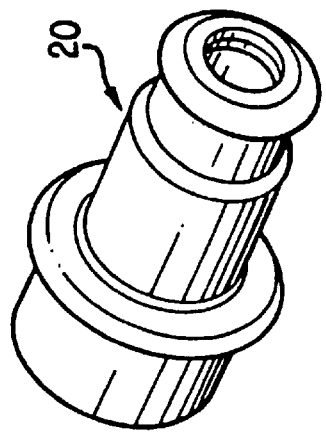
FIG. 4B is a perspective view of the sleeve portion shown in FIG. 4.
Figure 4:
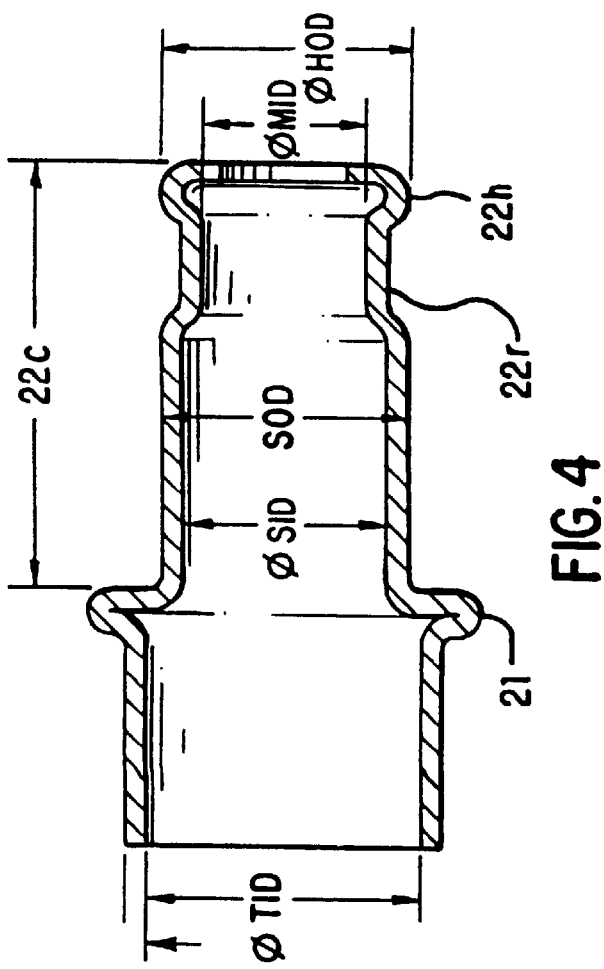
FIG. 4 is a sectional view of the sleeve member used in the embodiments of FIGS. 1 and 2.

As shown in detail in FIGS. 4–4B, the sleeve 20 includes a flange portion 21 and a body portion 22 extending longitudinally from the flange portion 21. The flange portion 21 has a radial dimension FRD that is greater than the radial dimension BRD of the opening or through bore 18 in the support wall 16 so that the flange portion of the sleeve cannot pass through the opening 18 in the support member 16. The body portion 22 includes a cylindrical portion 22c having a radially inner cylindrical wall and a radially outer cylindrical wall, the radial dimension of the radially outer cylindrical wall is less than the radial dimension of the opening in the support wall so that the cylindrical portion of the sleeve can be inserted into the opening 18 in the support wall 16. The cylindrical portion extends along a longitudinal axis from the flange 21 to a head portion 22h formed in the cylindrical portion opposite the flange. The head portion 22h of the sleeve 20 is partially capped by a radially inwardly extending flange to provide a cap for the end of the conduit. The cylindrical portion also includes a recess located between the head and end the flange end of the cylindrical portion.

The lock clip member 30 includes a base flange 31 and a body portion 32. In this embodiment, the body portion 32 includes a cylindrical portion 33 and an inclined portion 34. The flange portion 31 has a radially outer dimension CFRD that is greater than the dimension BRD of the opening 18 in the support wall 16 so that the flange portion of the clip 30 cannot pass through the opening 18 in the support member 16.

The cylindrical portion 33 has a radially inner dimension CRID and a radially outer dimension CROD. The radially inner dimension CRID of the cylindrical portion is large enough to allow the cylindrical portion 33 of the clip 30 to slide over the cylindrical portion 22c of the sleeve and the radially outer dimension CROD of the cylindrical portion of the clip member is small enough to allow the clip member to pass into the hole or opening 18 in the support wall 16.

Figure 1A:
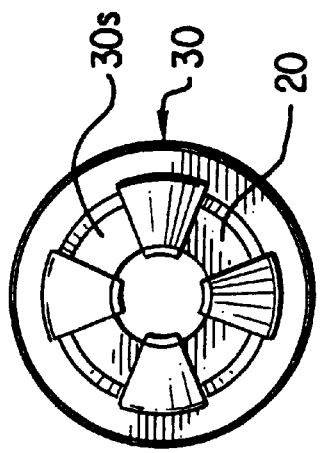
FIG. 1A is an end view of the end fitting shown in FIG. 1.

The inclined portion 34 of the clip 30 is tapered at an angle of about 45° with respect to the axis of the cylindrical portion. In the embodiment shown, four longitudinally extending slits 30s divide the inclined portion 34 and most of the cylindrical portion 32 into four circumferentially spaced fingers 37, as is clear from FIG. 1A. Each of the fingers extend through an arc of about 45°. Naturally, a different number of fingers could be provided. Indeed, as few as two fingers could be provided. Moreover, the fingers need not be entirely separated from one another. As an alternative to longitudinal slits 30s, a perforation or weakened portion could be provided to allow for the necessary radial expansion as described hereinafter.

Figure 1:
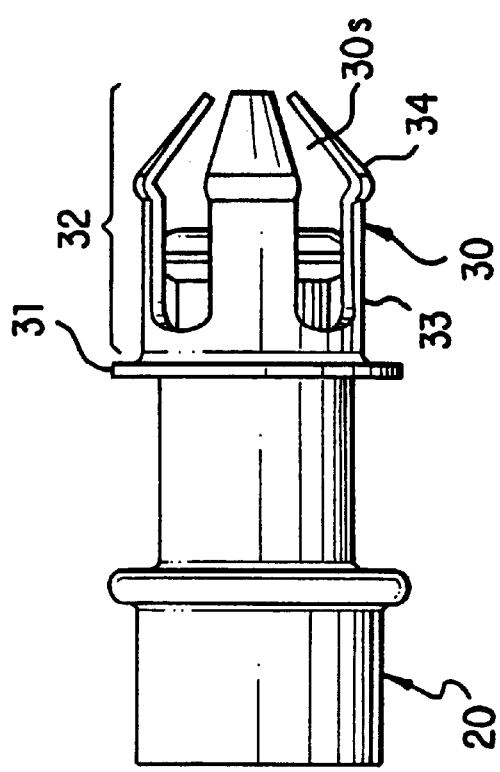
FIG. 1 is a side view of the first embodiment of the ending fitting of the present invention.
Figure 13:
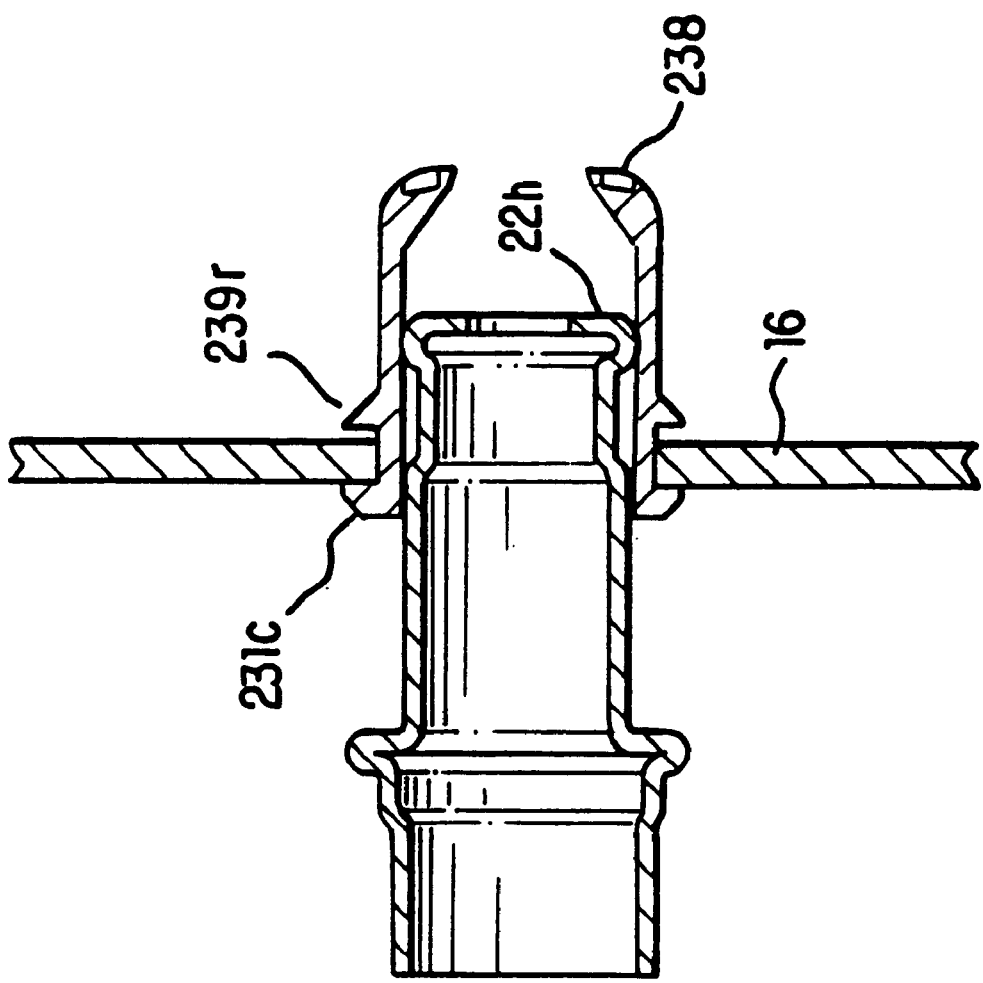
FIG. 13 is a sectional view showing an embodiment of the present invention in which the clip is pre-assembled into the mating part or support wall.
Figure 14:
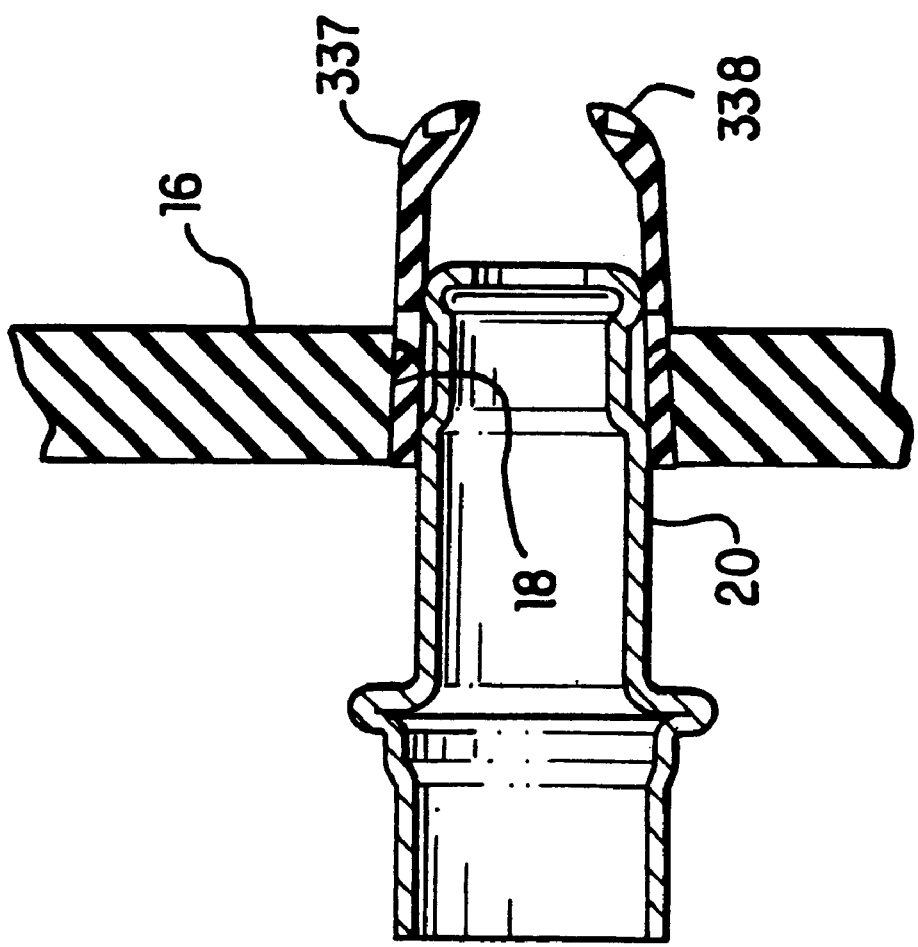
FIG. 14 is a sectional view showing an embodiment of the present invention in which the clip is formed integrally with the mating part or support wall.

The lock clip member 30 is at the end of the sleeve 20 during shipping, as shown in FIG. 1, prior to installation. As shown in FIGS. 2–3B and discussed below, the clip can include retaining tabs 39 to maintain the clip member in place during shipping. It should also be noted that the clip member could be pre-assembled into the mating part and not shipped with the cable, as shown in FIG. 13 for example. If the clip member is to be pre-assembled into the mating part or support member it should include means, such as crushed ribs or reversed tabs (as shown in FIG. 13) for securing the clip member in the support member. If the clip member is firmly secured to or integral with the support member (as shown in FIG. 14), then the base flange may be omitted from the clip member.

Regardless of whether the clip member is retained on the sleeve or pre-assembled onto the mating part, some portion of the clip member, typically the base flange 31 on the clip member, will contact the mating part (support member) and prevent the clip member from traveling through the mating part. During assembly, this ordinarily occurs when the base flange 31 contacts the mating part 16. Again, the mating part 16 could be a backing plate, a frame member, or brake lever component.

When the clip member 30 is fixed or otherwise stops traveling through the mating part 16, the sleeve continues to move through the clip member. The head end 22h of the sleeve 20 contacts the inside surface of the inclined portion 34 of the clip 30 member pushing the fingers 37 radially outward, thus causing the clip member to expand radially. When the sleeve 20 is pushed entirely through the clip member, the fingers 37 snap into the recess 22r in the sleeve 20 to prevent removal of the sleeve from the clip member. Of course, other forms of locking means could be provided on the clip member to engage the sleeve when it is fully seated in the clip member.

The radial expansion of the clip member 30 prevents the clip member from being removed from the mating part, as shown and described in greater detail in connection with FIGS. 9–12B below. This arrangement offers various advantages. To begin with, installation force is reduced. There is no need compress the fingers during insertion into the mating part since the fingers do not expand until after the clip member passes through the opening. In addition, as explained in detail below, the designs of the present invention have a one size fits all capacity that allows the end fitting to be used with different thicknesses of support members. This is in contrast to known designs in which a different part must be used for different thicknesses of support wall.

In addition, the lock clip member, though shown of metal, could be made of an electrical insulator, such as hard plastic. Forming the clip of plastic provides electrical isolation between the control cable and the mating part. This will reduce the galvanic corrosion. In addition, since this design expands into the mating part, a connection can be provided without any lash or looseness.

Figure 1B:
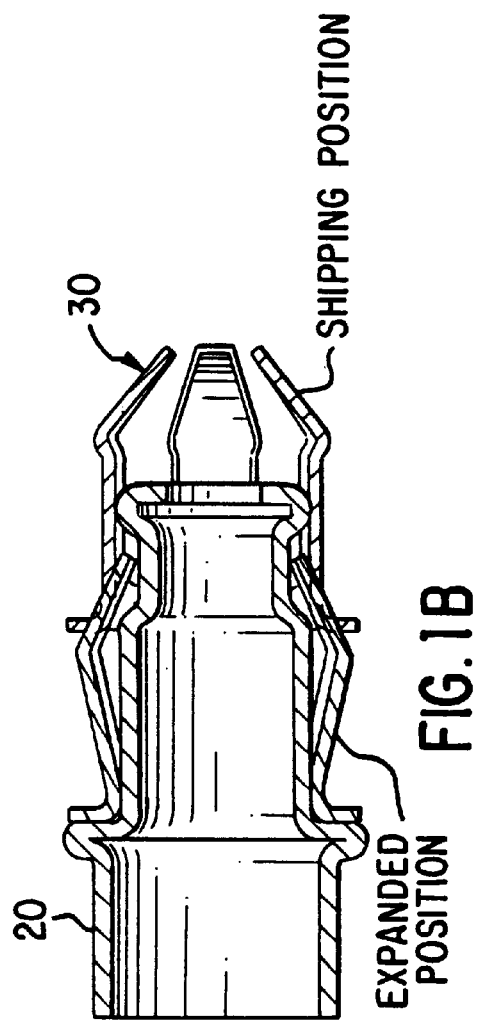
FIG. 1B is a cross-sectional view of the end fitting of FIG. 1 showing the clip member in two different locations, the first location being the shipping position shown in FIG. 1 and the second position being the engaged expanded position.

FIG. 1B shows the clip member in both its initial shipping position and its final assembled position. First, the clip member 30 is shown in a shipping position consistent with the side view of FIG. 1. The clip member is also shown in the position it assumes when the sleeve 20 is fully inserted in the clip member to cause the clip member to expand and snap into the recess 22r to prevent removal of the sleeve from the clip member.

As will be appreciated, the longitudinally extending portion of the clip member 30 is specially designed such that it is adaptable to a very wide range of support wall thicknesses. In particular, this design includes of clip member 30 with a length in the longitudinally extending direction that is much greater than the width of the clip member 30. This feature allows greatly improved flexibility in fitting to a wall opening, which assures tight seating in both thin and thick wall applications.

FIGS. 2 and 2A show an alternative construction that is similar to the construction shown in FIGS. 1 and 1B in most respects. However, in the embodiment of FIGS. 2 and 2A, the clip member 30 includes retaining tabs 39 for keeping the clip member in the shipping position until installation.

FIGS. 3–3C shows the clip member of the embodiment of FIG. 2 in greater detail. As shown therein, the clip member includes a base flange 31 and a plurality of inclined fingers 37 having a radially outer diameter FOD and a radially inner diameter FID. The clip member also includes the retaining tabs 39. The retaining tabs 39 are short in comparison with the fingers 37. Thus, while the tabs are, like the fingers, inclined radially inward, the radially inner diameter TID of the spaced tabs is much greater than the radially inner diameter FID of the inclined fingers 37. As a result, the head portion 22h of the sleeve 20 can be pushed past the retaining tabs 39 with comparatively little effort and little deflection of the tabs 39. In the embodiment show, for example, the radially inner diameter TID of the spaced tabs is more than twice the radially inner diameter FID of the inclined fingers 37. To ensure proper operation, the radially inner diameter TID of the spaced tabs should be no less than 80% of the outer dimension HOD of the head of the sleeve and the radially inner diameter FID of the inclined fingers 37 should be no more than 60% of the outer dimension HOD of the head of the sleeve.

Prior to shipping, the sleeve can be pushed into the clip until the head of the sleeve 20 pushes the retaining tabs 39 radially outward to allow the sleeve head past the tabs 39. When the sleeve head is past the retaining tabs 39, the tabs 39 snap into the recess 22r in the sleeve 20 so that the sleeve 20 and clip member 30 are maintained in the position shown in FIG. 2.

As an alternative to the retaining tabs 39 shown in FIGS. 3–3B, the clip and sleeve could be formed as a single element as discussed in detail in connection with FIG. 15, below.

The dimensions of the various components relative to one another is important to ensure easy installation and secure attachment. As a starting point, if one considers the radially outer dimension CROD of the cylindrical portion 33 of the clip member 30 as a base and the longitudinal axis of the clip member as a base, the inclined fingers should be at an angle of about 45° to the longitudinal axis of the cylindrical portion and the inclined portion of the fingers should have a length that is in the range of 0.4 and 0.6 times the diameter of the cylindrical portion, preferably about ½ the diameter. The radially inner longitudinal ends of the inclined fingers collectively define a finger inner diameter FID that is less than the radial innermost dimension RID of the sleeve as shown in FIG. 4.

The base flange 31 of the clip member must have an outer diameter CFRD that is greater than the outer diameter of the cylindrical portion 33 of the clip member 30. Preferably, the base flange has an outer diameter that is at least 1.2 times as great as the outer diameter CROD of the cylindrical portion. In addition, the total length of the inclined fingers 37 on the clip member should be at least equal to the outer diameter CROD of the cylindrical portion.

In the embodiment shown in FIG. 3, the length of the cylindrical portion 33 is preferably 0.7–0.8 times the outer diameter CROD of the cylindrical base.

In addition, the retaining tabs 39 are inclined at an angle about 45° and have a length that has less than ⅓ the outer diameter CROD of the cylindrical portion.

The dimensions of the sleeve are also important as described hereinafter in connection with FIGS. 4–4B, which show the sleeve. Taking the other diameter SOD of the cylindrical portion of sleeve as a base, the outer diameter FRD of the flange formed on the clip member should be at least 1.5 times the outer diameter of the sleeve. The head end of sleeve preferably has an outer dimension HOD that is substantially equal to the outer diameter of the sleeve. To ensure proper installation, as described below, the head portion 22h must be a continuous annular ring, i.e., not split so that the outer surface of the head portion does not move inward when the head portion 22h contacts the inclined portion of the clip member. The recessed portion of the sleeve is preferably less than 90% of the outer diameter of the sleeve. The sleeve 20 also serves the important purpose of serving as an end fitting that caps the end of the conduit, but allows the inner core to pass through. For this reason, the sleeve must include a large passage at one end and a significantly smaller passage at the opposite end. In the embodiment shown, the larger passage has a diameter that is at least 1.5 times as great as the diameter of the smaller passage. In addition, it is critically important to ensure that the sleeve 20 does not move relative to the conduit that it caps. To this end, the sleeve includes a tubular portion 20cr that extends from the side of the base flange 21 that is opposite the head portion 22h. The tubular portion defines the larger passage of the sleeve discussed above and is longitudinally fixed to the conduit by crimping or bonding.

Figure 5A:
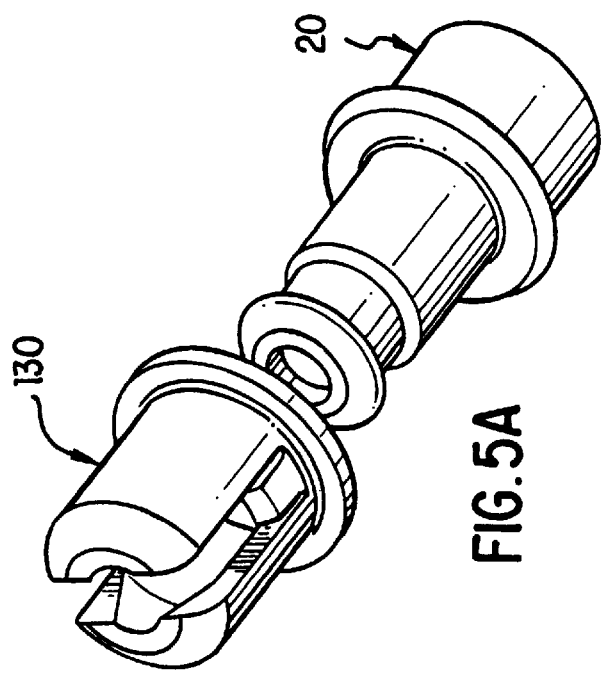
FIG. 5A is a perspective view of the embodiment of FIG. 5.
Figure 5:
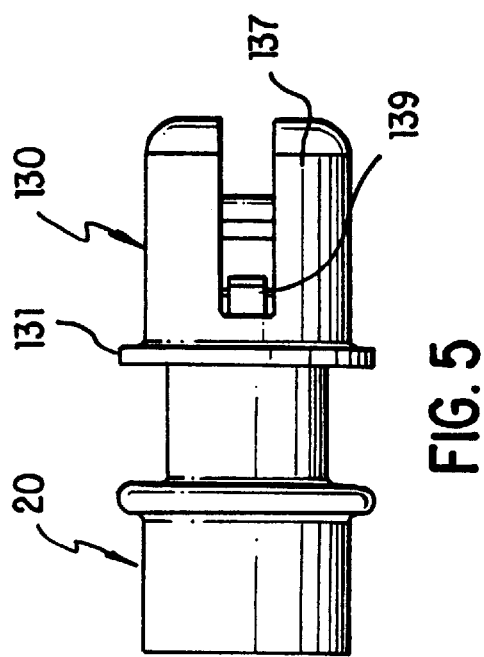
FIG. 5 is a side view of another embodiment of the present invention.

FIGS. 5 and 5A shows another embodiment according to the present invention in which a different form of spring clip member 130 is used. The sleeve 20 is essentially the same as that described above and discussed in detail connection with FIGS. 4A–4B.

The details of the spring clip member 130 are shown in connection with the FIGS. 6–6D. As shown therein, the clip member 130 includes a base flange 131 and a cylindrical body portion 132. The cylindrical body portion 132 includes two resilient fingers 137 that are substantially cylindrical on the outside, but inclined inside.

Inclined retaining tabs 139 are provided between the fingers 137 on each side of the spring clip member. The profile of the tab 139 is shown in detail in FIG. 6B. As shown, the retaining tabs 139 are short in comparison with the fingers 137. Thus, while the tabs are, like the fingers, are inclined radially inward, the head portion 22h of the sleeve 20 can be pushed past the retaining tabs 139 with comparatively little effort and deflection of the tabs 139.

As with the tabs 39 of the first embodiment, the purpose of the tabs 139 is to retain the clip member 130 in the proper position relative to the sleeve 20 during shipping. Prior to shipping, the sleeve 20 can be pushed into the clip until the head of the sleeve 20 pushes the retaining tabs 139 radially outward to allow the sleeve head past the tabs 139. When the sleeve head is past the retaining tabs 139, the tabs 139 snap into the recess 22r in the sleeve 20 so that the sleeve 20 clip member 30 are maintained in the position shown in FIG. 5. Once installation begins, the retaining tabs are easily deflected out of the way to allow relative movement to facilitate installation.

Again, the dimensions of the spring clip member are important to ensure easy installation and secure attachment. These dimensions will be described with reference to FIGS. 6–6D. As a starting point, if one considers the radially outer dimension CROD of the cylindrical portion 132 of the clip member 30 as a base and the longitudinal axis of the clip member as a base, the inside surface of the resilient fingers includes a portion 137i that is inclined at an angle of about 30° to the longitudinal axis of the cylindrical portion and the inclined portion of the fingers should have a length that is in the range of 0.4 and 0.6 times the diameter of the cylindrical portion, preferably about ½ the diameter.

The base flange 131 of the clip member must have an outer diameter CFRD that is greater than the outer diameter of the cylindrical portion 132 of the clip member 130. Preferably, the base flange has an outer diameter that is at least 1.2 times as great as the outer diameter CROD of the cylindrical portion. The base flange 131 also preferable includes a chamfer 231c (see FIGS. 9, 9A and 9B) to facilitate disassembly as described below in greater detail in connection with FIG. 9B. In addition, the total length of the inclined fingers 37 on the clip member should be at least equal to the outer diameter of the cylindrical base.

In addition, the retaining tabs 139 have an outer portion that is inclined by at least 10° and extend radially inward of the inside surface of the cylindrical portion 132 by a distance that is less than 0.10 times the inside diameter of the cylindrical portion 132. To ensure proper operation, the radially inner diameter TID of the spaced tabs 139 should be no less than 80% of the outer dimension HOD of the head portion 22h of the sleeve and the radially inner diameter FID of the inclined fingers 137 should be no more than 60% of the outer dimension HOD of the head of the sleeve.

The dimensions of the sleeve have been discussed above in connection with FIGS. 4–4B.

Figure 7:
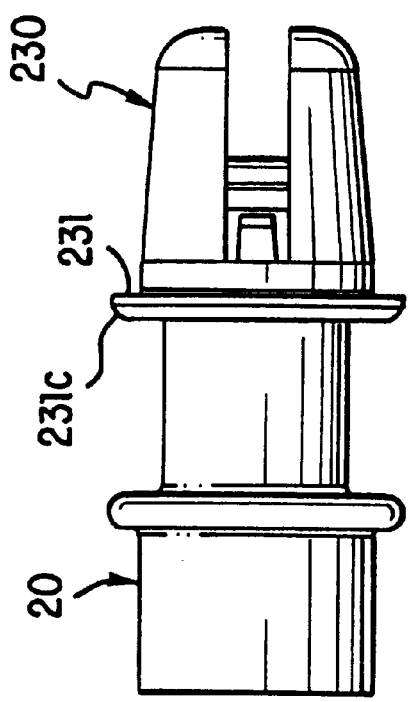
FIG. 7 is a side view of another embodiment of the present invention.
Figure 7A:
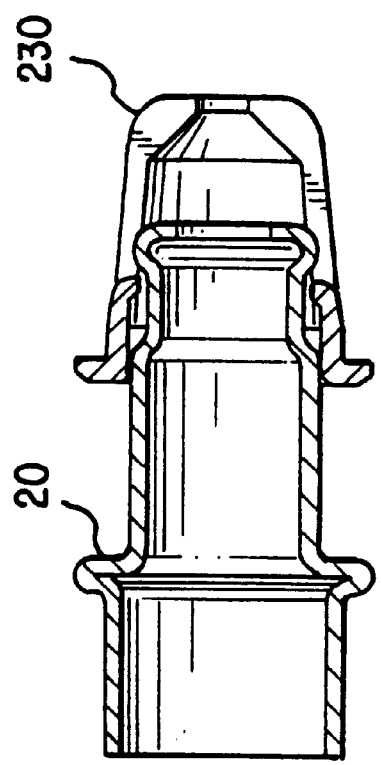
FIG. 7A is a perspective view of the embodiment of FIG. 7.

FIGS. 7 and 7A show another embodiment according to the present invention in which a different form of spring clip member 230 is used. The sleeve 20 is essentially the same as that described above and discussed in detail connection with FIGS. 4A–4B. The spring clip member is preferable made an electrical insulator, such as hard plastic. As noted above, forming the clip of plastic provides electrical isolation between the control cable and the mating part. This will reduce the galvanic corrosion.

The details of the spring clip member 230 are shown in connection with the FIGS. 8–8D. As shown therein, the spring clip member 230 is very similar to the clip member 130 of FIGS. 5–6D. Specifically, the clip member 230 includes a base flange 231 and a body portion 232 that tapered at about 5° relative to the longitudinal axis to facilitate installation. The tapered body portion 232 includes two resilient fingers 237 that are slightly tapered on the outside, but more sharply inclined inside.

As best shown in FIGS. 8A and 8D, the longitudinal end of each of the resilient fingers 237 include holes 238 to facilitate removal of the clip after installation, if desired.

Inclined retaining tabs 239 are provided between the fingers 237 on each side of the spring clip member. The profile of the tab 239 is shown in detail in FIG. 8B. As shown, the retaining tabs 239 are short in comparison with the fingers 237. Thus, while the tabs are, like the fingers, inclined radially inward, the head portion 22h of the sleeve 20 can be pushed past the retaining tabs 239 with comparatively little effort and deflection of the tabs 239.

As with the tabs 39 of the first embodiment, the purpose of the tabs 239 is to retain the clip member 230 in the proper position relative to the sleeve 20 during shipping. Prior to shipping, the sleeve 20 can be pushed into the clip until the head 22h of the sleeve 20 pushes the retaining tabs 239 radially outward to allow the sleeve head past the tabs 239. When the sleeve head 22h is past the retaining tabs 239, the tabs 239 snap into the recess 22r in the sleeve 20 so that the sleeve 20 clip member 30 are maintained in the position shown in FIG. 7. Once installation begins, the retaining tab is easily deflected out of the way to allow relative movement to facilitate installation. Again, the dimensions of the spring clip member are important to ensure easy installation and secure attachment. These dimensions will be described with reference to FIGS. 8–8D. As a starting point, if one considers the maximum radially outer dimension MROD of the tapered portion 232 of the clip member 30 as a base and the longitudinal axis of the clip member as a base, the inside surface of the resilient fingers includes a portion that is inclined at an angle of about 30° to the longitudinal axis of the tapered portion and the inclined portion of the fingers should have a length that is in the range of 0.4 and 0.6 times the maximum diameter MROD of the tapered portion, preferably about ½ the diameter.

The base flange 231 of the clip member must have an outer diameter CFRD that is greater than the maximum outer diameter MROD of the tapered portion 232 of the clip member 230. Preferably, the base flange has an outer diameter that is at least 1.2 times as great as the maximum outer diameter of the tapered portion. The base flange 231 also preferable includes a chamfer 231c to facilitate disassembly as described below in greater detail in connection with FIG. 9B.

In addition, the total length of the inclined fingers 37 on the clip member should be at least equal to the outer diameter of the tapered base.

In addition, the retaining tabs 239 have an outer portion that is inclined by at least 10° and extend radially inward of the inside surface of the tapered portion 232 by a distance that is less than 0.10 times the maximum inside diameter of the tapered portion 232. To ensure proper operation, the radially inner diameter TID of the spaced tabs 139 should be no less than 80% of the outer dimension HOD of the head portion 22h of the sleeve and the radially inner diameter FID of the inclined fingers 137 should be no more than 60% of the outer dimension HOD of the head of the sleeve.

Again, the dimensions of the sleeve have been discussed above in connection with FIGS. 4–4B.

To illustrate the use and operation of the end fittings of the present invention even more completely, reference will now be made to FIGS. 9–12B, which illustrate the end fitting at various stages of installation, namely just before installation, when the clip is almost fully installed and when the sleeve is fully seated within the clip. These figures illustrate installation on both a relatively thin mating part (support member) and a relatively thick mating part to demonstrate how a single clip can be used for both thin and thick support members. Moreover, to ensure total clarity, the figures illustrate installation of the clip attached to the cable and with the cable omitted from the illustration.

Again, it is noted that the clip member could be preassembled into the mating part and not shipped with the cable. While this is not specifically illustrated, by referring to FIGS. 9A, 10A, 11A and 12A, one can see how the clip could be loosely preassembled into the mating part. In addition, by referring to FIGS. 9B, 10B, 11B and 12B, one can see how the clip could be tightly preassembled into or even formed integrally with the mating part. If the clip member is to be pre-assembled into the mating part or support member it should include means, such as crushed ribs or reversed tabs (shown in FIG. 13) for securing the clip member in the support member. If the clip member is firmly secured to the support member, then the base flange may be omitted from the clip member.

Now, turning to FIGS. 9–12B, it can be seen that the clip 231 illustrated is essentially identical to the clip of FIGS. 8–8A. It is noted, however, that the installation sequence is the same for each of the end fitting embodiments described herein.

FIG. 9 shows a coaxial cable with an end fitting of the type shown in FIGS. 7 and 7A as it is about to be inserted into a relatively thin mating part or support wall. The end fitting includes a sleeve member 20 and a clip member 230 that collectively secure the outer, tubular conduit member 12 of a co-axial control cable 10 within a through bore 18 provided in the relatively thin support member 16. The control cable 10 may be, for example, an automotive brake cable, and the support member 16 may be, for example, a dashboard housing wall, bracket, or similar anchor structure on the vehicle.

The details of the cable are not particularly significant to the present invention, but the end fitting must conform to general structure of the cable. Thus, it is noted that the cable 10 includes a conduit 12 and a strand 14. The conduit 12 includes a wire 12w wrapped helically in the form of a coil and a plastic jacket or sheath 12j covering the helical coil. The strand includes a flexible metallic core element 14c and resinous plastic tube or strand coating 14t. The flexible metallic core element 14c extends through the plastic tube and is freely movable longitudinally therein. The conduit terminates at a capped end of the sleeve 20 of the end fitting and protrudes from an open end of the sleeve 20 of the end fitting. The strand extends through the capped end of the sleeve 20 of the end fitting. A seal 13 is provided between the end of the conduit and the strand coating 14t in the proximity of the capped end of the sleeve 20 of the end fitting. The conduit has an exterior surface and the conduit end fitting is crimped to that exterior surface as indicated at 20cr. Naturally the sleeve 20 of the end fitting could be secured to the conduit in some other way, such as bonding. It is critically important, however, that the sleeve be longitudinally fixed with regard to the conduit, because movement between these elements, i.e., lash, can affect operation of the component being controlled by the cable.

Figure 9A:
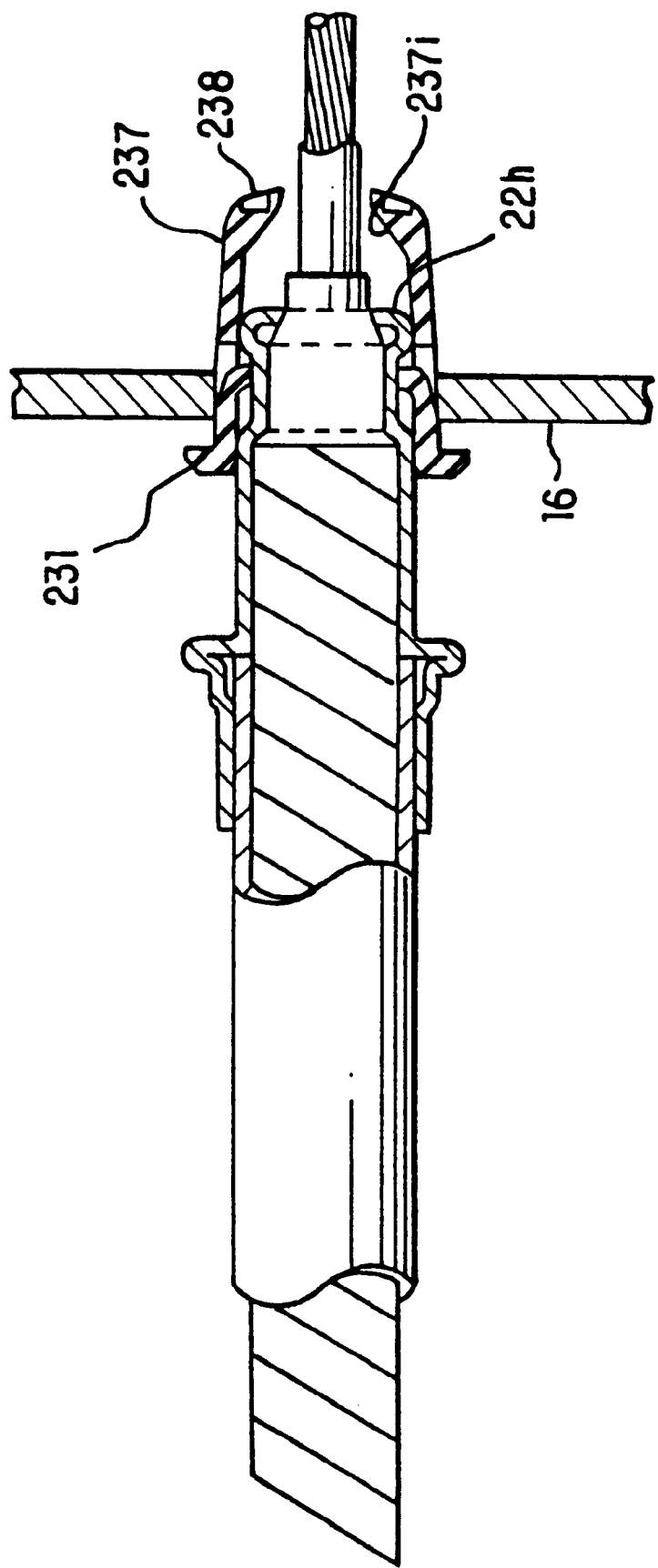
FIG. 9A is a sectional view showing the coaxial cable with end fitting of FIG. 9 partially installed into the thin mating part or support wall.

FIG. 9A shows the coaxial cable with end fitting of FIG. 9 partially installed into the thin mating part or support wall.

As shown therein, the outer surface of the clip, which has not yet been expanded, passes through the bore 18 in the support wall. In addition, it can be seen that the base flange 231 of the clip will not pass through the support wall 16. Thus, when the base flange contacts the support wall the clip will be prevented from moving further into the wall.

FIG. 9B shows the coaxial cable with end fitting of FIG. 9 fully installed into the thin mating part or support wall. As shown therein, the base flange 231 is now in full contact with the support wall to prevent the clip from moving further into the wall. In addition, the sleeve head has pushed the inclined inner surfaces 237i of the clip radially outward to expand the outer dimension of the clip 230 so that the clip cannot be retracted from the bore 18 in the support wall. Also, the inclined fingers of the clip have snapped back into the recess 22r provided on the sleeve to prevent the sleeve from being removed from the clip 230 so that the clip remains expanded. However, the clip 230 includes holes 238 at the end of the inclined fingers that could receive a tool, such as a clip pliers, for prying the fingers 237 out of the recess 22r to allow disassembly, if desired. In addition, because a chamfer 231c was provided on the base flange of the clip 230, a cylindrical groove is provided between the base flange of the clip 231 and the flange 21 of the sleeve 20 in the assembled state. The cylindrical groove allows insertion of a tool, such as a screw driver to forcible remove the sleeve 20 from the clip 230, if desired.

Figure 11:
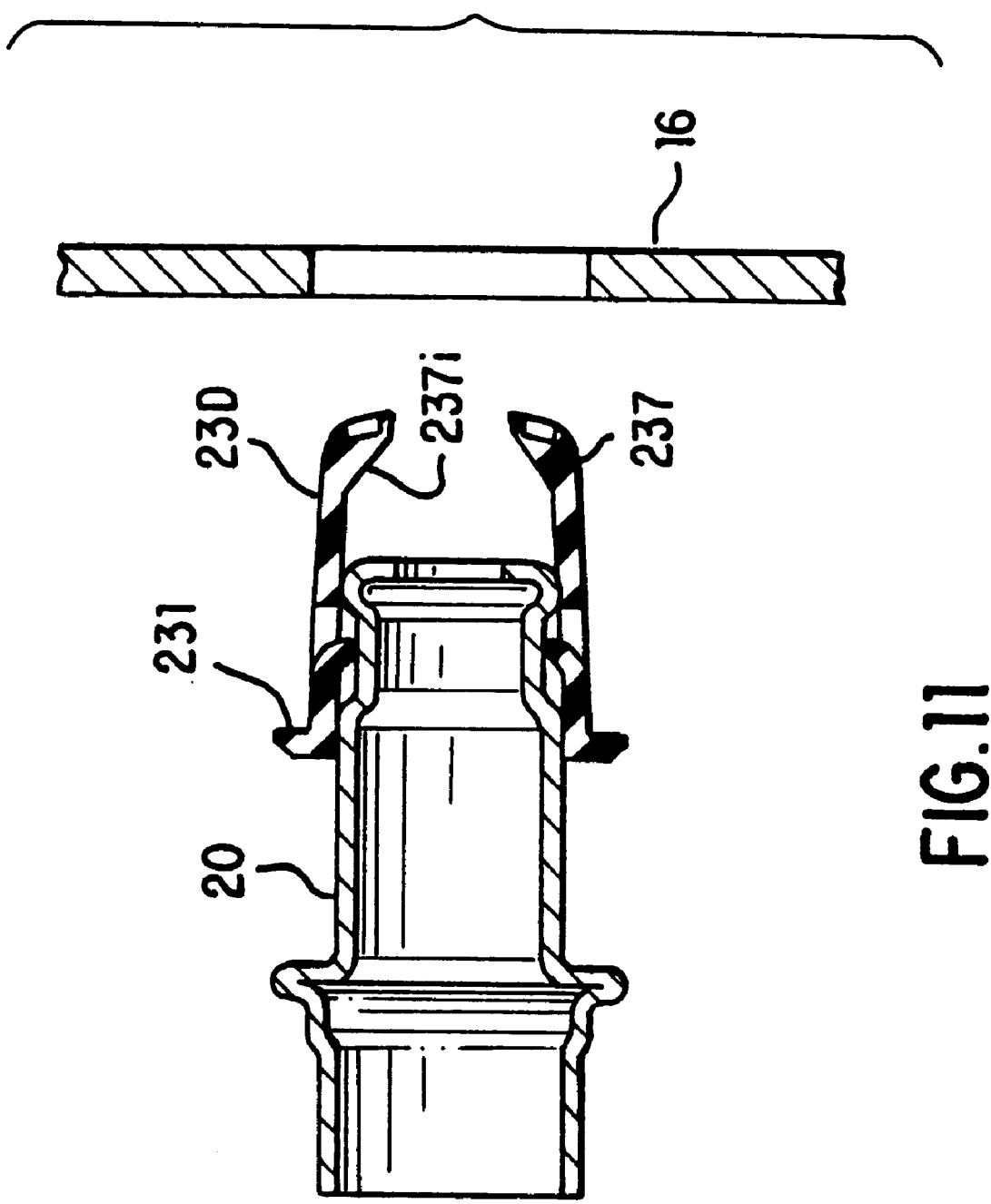
FIG. 11 is a sectional view showing an end fitting alone as it is about to be inserted into a thin mating part or support wall.
Figure 11A:
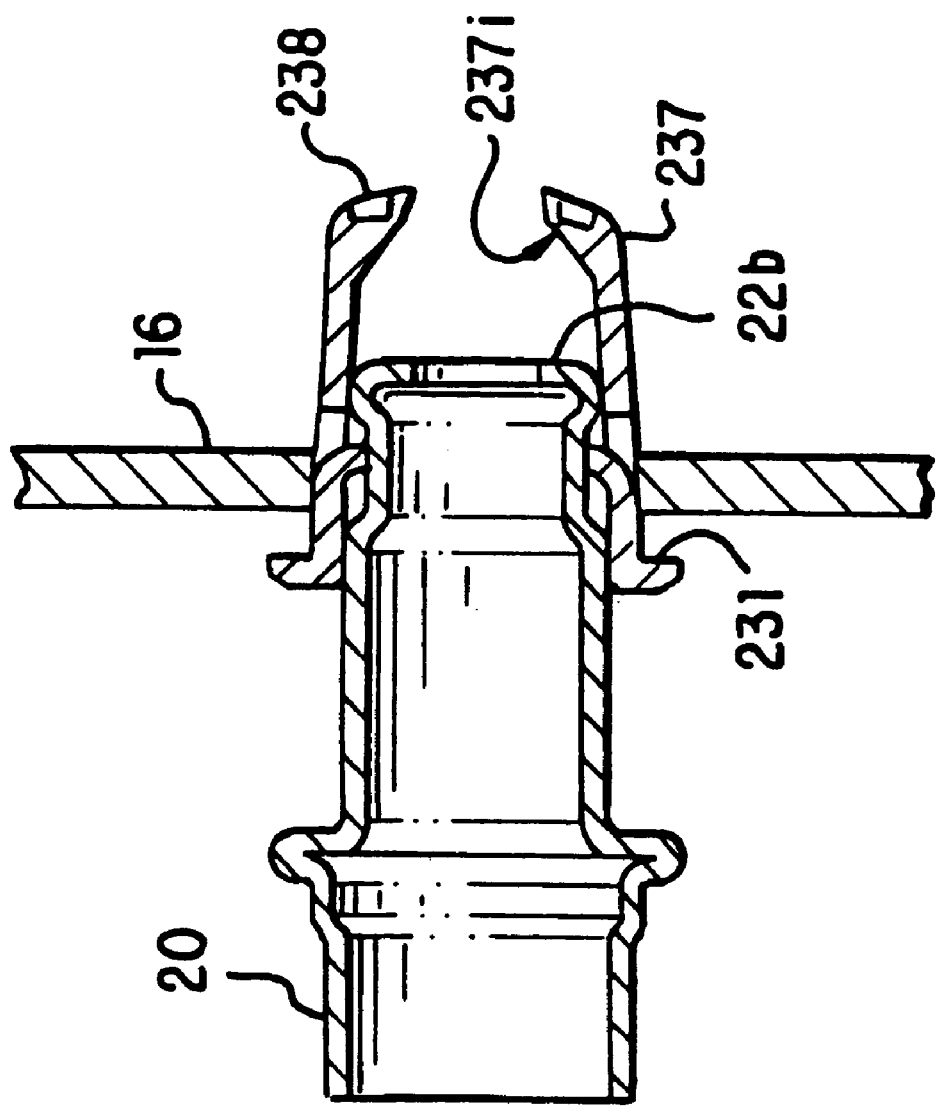
FIG. 11A is a sectional view showing the end fitting of FIG. 11 partially installed into the thin mating part or support wall.

FIGS. 11–11A, show the same sequence with the details of the cable omitted for clarity.

Figure 10:
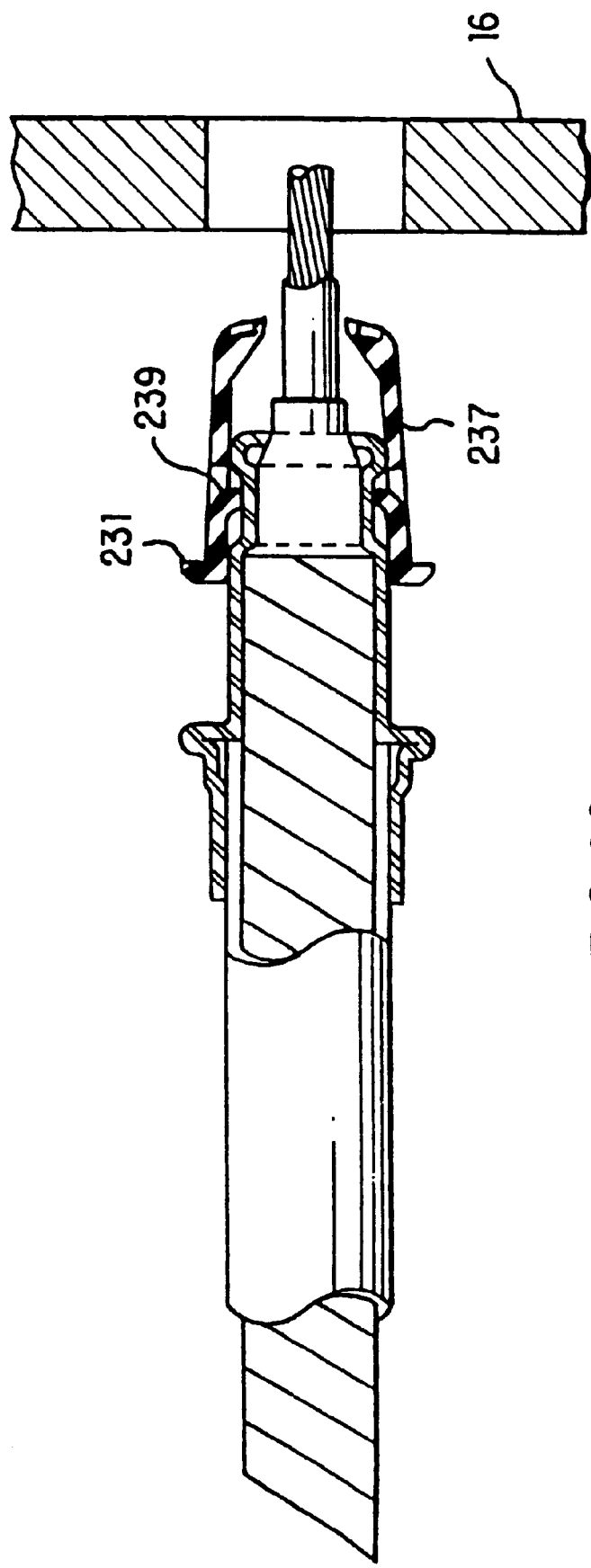
FIG. 10 is a sectional view showing a coaxial cable with end fitting as it is about to be inserted into a thick mating part or support wall.
Figure 10A:
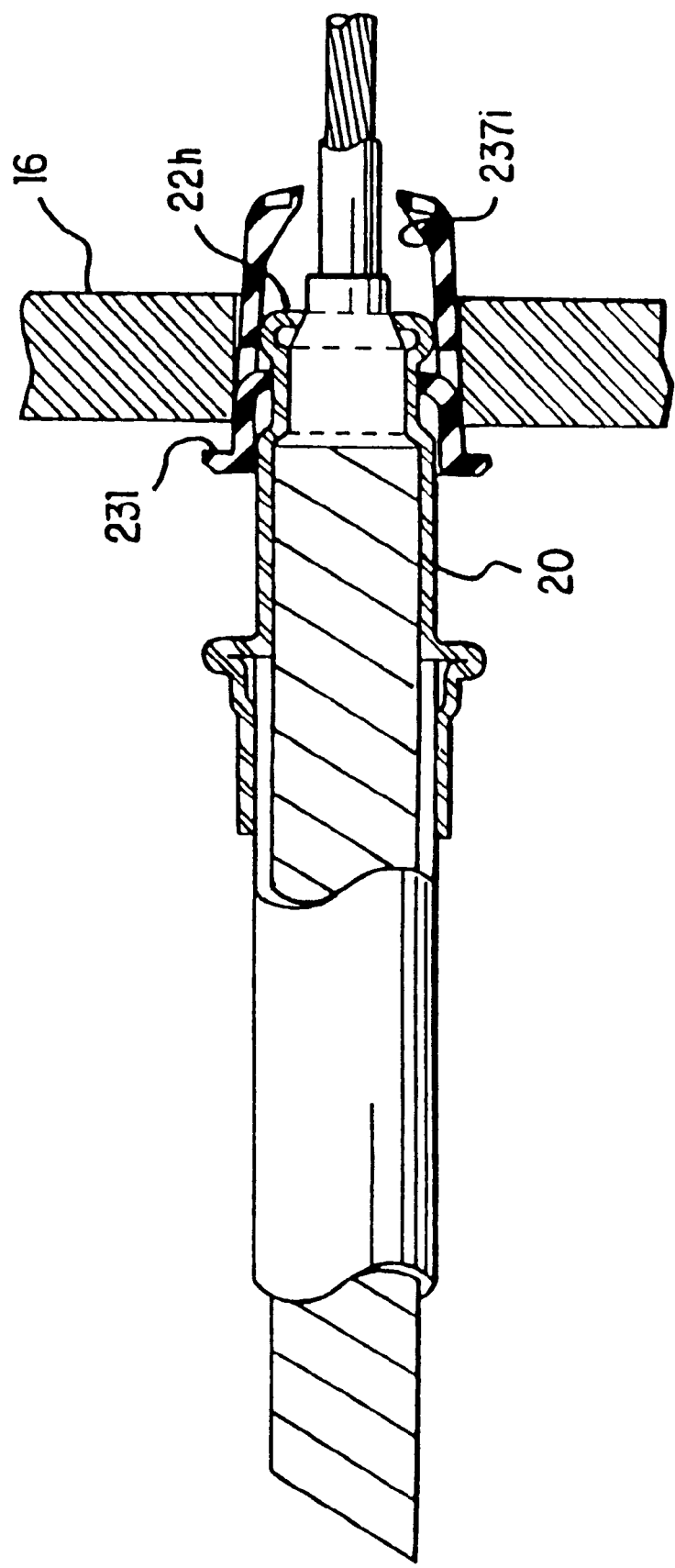
FIG. 10A is a sectional view showing the coaxial cable with end fitting of FIG. 10 partially installed into the thick mating part or support wall.

The installation sequence is essentially the same for a much thicker support wall as shown in FIGS. 10–10A. To begin with, FIG. 10 shows a coaxial cable with end fitting as it is about to be inserted into a thick mating part or support wall. As shown therein, FIG. 10A shows the coaxial cable with end fitting of FIG. 10 partially installed into the thick mating part or support wall. Again, the outer surface of the clip, which has not yet been expanded, passes through the bore 18 in the support wall. In addition, it can be seen that the base flange 231 of the clip will not pass through the support wall 16. Thus, when the base flange contacts the support wall the clip will be prevented from moving further into the wall.

Figure 10B:
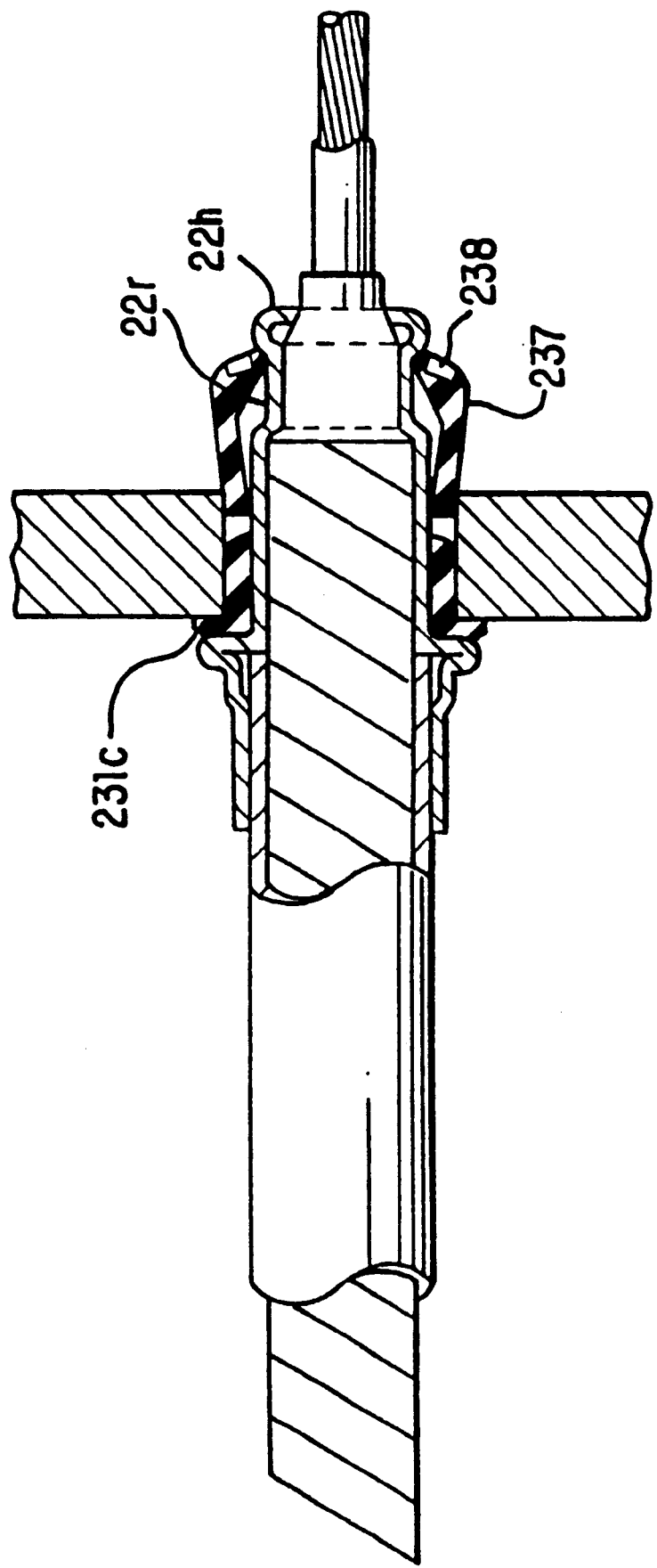
FIG. 10B is a sectional view showing the coaxial cable with end fitting of FIG. 10 fully installed into the thick mating part or support wall.

FIG. 10B shows the coaxial cable with end fitting of FIG. 10 fully installed into the thick mating part or support wall. As with the thin support member in FIG. 9B, the base flange is now in full contact with the support wall to prevent the clip from moving further into the wall. In addition, the sleeve head has pushed the inclined inner surfaces of the clip radially outward to expand the outer dimension of the clip 230 so that the clip cannot be retracted from the bore 18 in the support wall. Also, the inclined fingers of the clip have snapped back into the recess 22r provided on the sleeve to prevent the sleeve from being removed from the clip 230 so that the clip remains expanded. However, the clip 230 includes holes 238 at the end of the inclined fingers that could receive a tool for prying the fingers 237 out of the recess 22r to allow disassembly, if desired.

Figure 12:
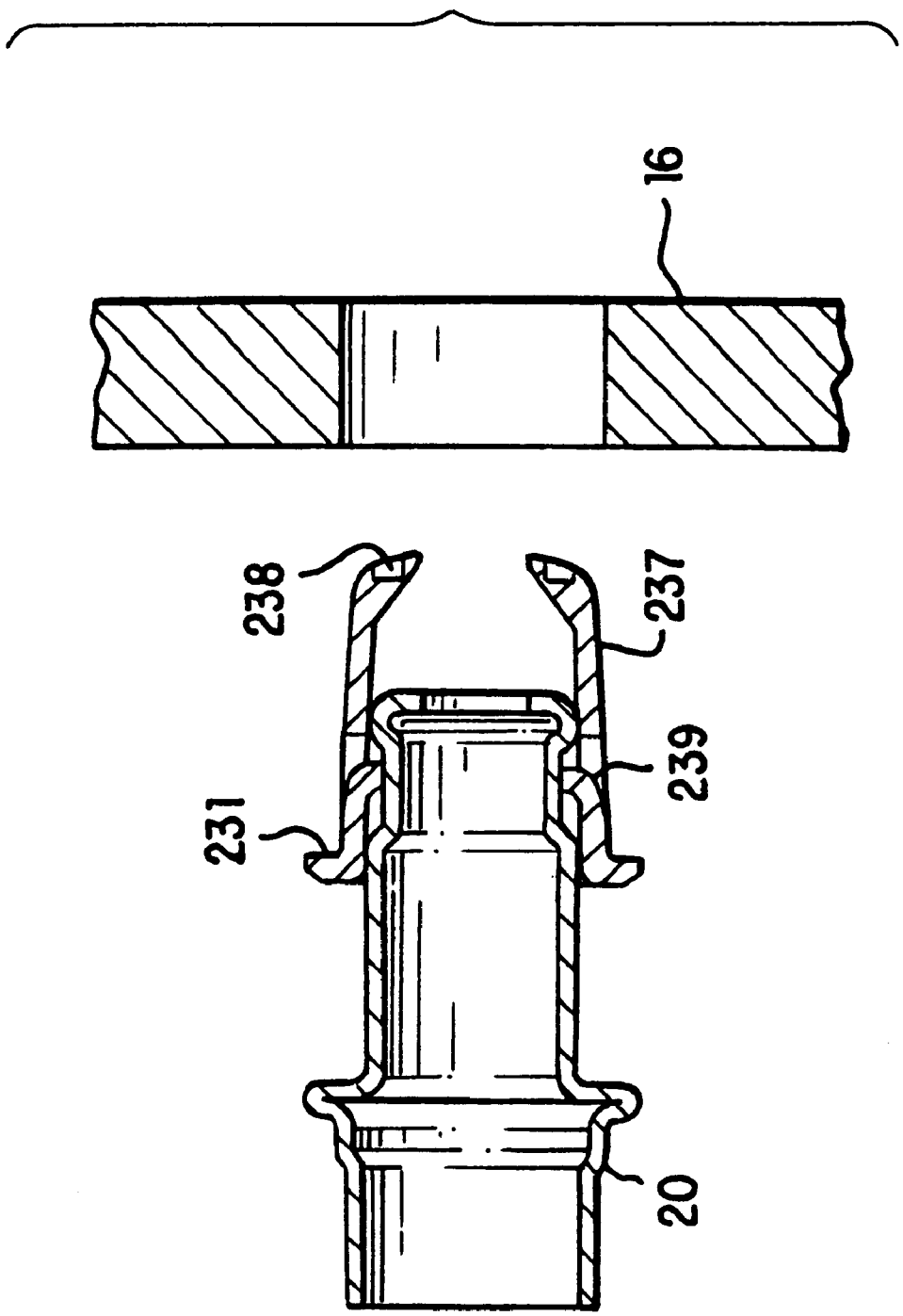
FIG. 12 is a sectional view showing an end fitting alone as it is about to be inserted into a thick mating part or support wall.
Figure 12A:
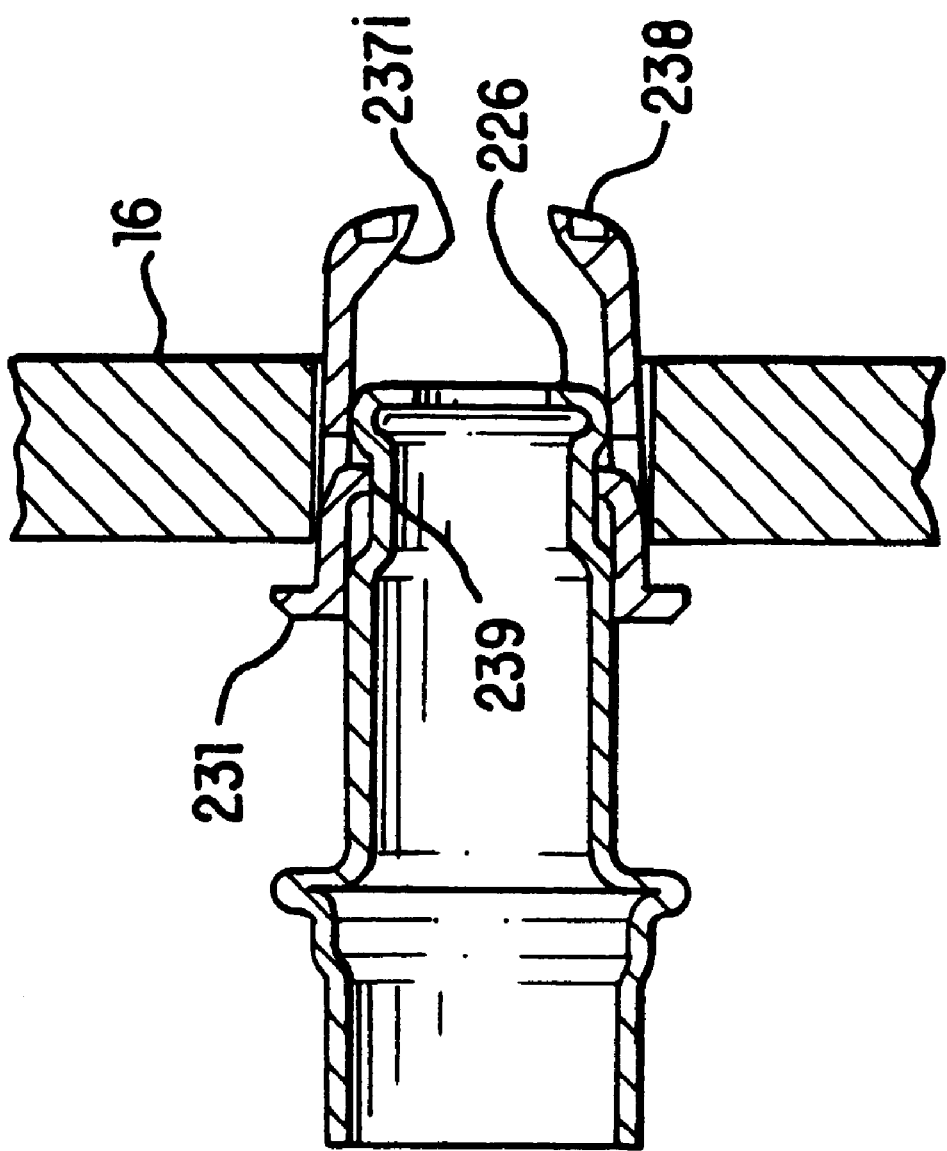
FIG. 12A is a sectional view showing the end fitting of FIG. 12 partially installed into a thick mating part or support wall.

FIGS. 12–12A, show the same sequence with the details of the cable omitted for clarity.

FIG. 13 shows another embodiment of the present invention. In this embodiment, the clip is pre-assembled into the mating part or support wall. The clip member 231 includes reversed tabs 239r for securing the clip member in the support member 16. Thus, prior to full installation of the sleeve into the clip, the reversed tabs 239r together with the base flange 231 maintain the clip in the bore 18 formed in the support wall 16.

Figure 13B:
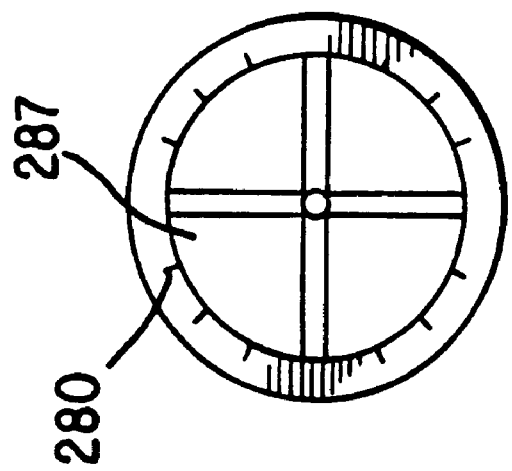
FIG. 13B is an end view of the embodiment of FIG. 13A.
Figure 13A:
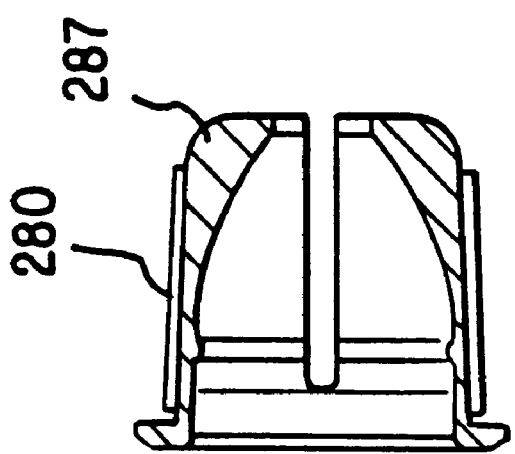
FIG. 13A is a sectional view showing an embodiment of the present invention in which the clip includes a crush ribs feature.

In another embodiment, as shown in FIGS. 13A–13B, crushed ribs on the outer surface of the clip are used for the purpose of maintaining the clip in the bore formed in the support wall. As shown in FIG. 13B, the crushed ribs feature includes latitudinal ribs 280 formed in the clip 287, with the clip 287 longitudinally angled such that the clip 287, as inserted, begins smaller than the hole (not shown), but increases in size by angling outward relative to the hole as the clip is inserted. The ribs begin to crush as the angling size exceeds the hole size during insertion. FIG. 13B presents an end view of the embodiment incorporating the crush ribs feature. This feature enhances fit of the device in a hole since the crushing ribs improve seating of the clip and sleeve device.

FIG. 14 shows another embodiment of the present invention. In this embodiment, the clip is formed integrally with the mating part or support wall. Since the clip member is integral with the support member, the base flange may be omitted from the clip member. Inclined fingers extend directly from the bore formed in the support wall 16.

Figure 15:
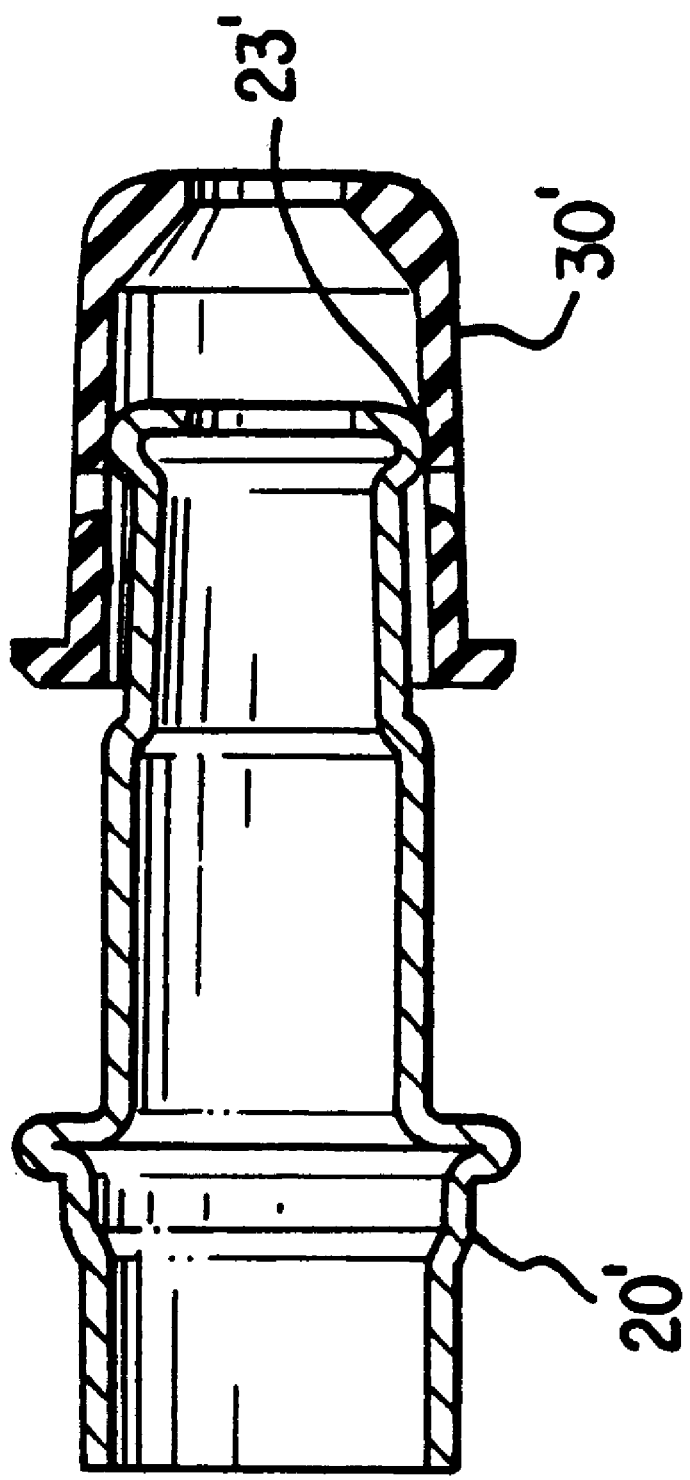
FIG. 15 is a sectional view showing an embodiment of the present invention in which the clip is formed integrally with the sleeve.

FIG. 15 shows another embodiment of the present invention. In this embodiment, the clip is formed integrally with the sleeve. One advantage of such an arrangement is that it serves as an alternative to the retaining tabs 39 shown in FIGS. 3–3B. Specifically, the clip and sleeve are be formed as two components of a single element. The clip component 30' is connected to the sleeve component 20' by one or more frangible elements 23'. During installation, the sleeve and clip are pushed longitudinally into the through bore 18. When the clip member 30 is fixed or otherwise stops traveling through the mating part 16, such as when the base flange 31 of the clip 30 contacts the mating part 16, continued pressure on the sleeve causes the frangible elements 23' to rupture, separating the sleeve from the clip so that the sleeve continues to move through the clip member. The head end 22h of the sleeve 20 contacts the inside surface of the inclined portion 34 of the clip 30 member pushing the fingers 37 radially outward, thus causing the clip member to expand radially. When the sleeve 20 is pushed entirely through the clip member, the fingers 37 snap into the recess 22r in the sleeve 20 to prevent removal of the sleeve from the clip member.

The frangible feature of this embodiment also facilitates fabrication, shipment, and installation, since the clip and sleeve components consist of a single piece with connecting frangible elements. With regard to easing fabrication, for example, the single connected clip and sleeve component can be fabricated using a single plastic injection molding. Shipment and installation are improved since the components are connected by frangible elements into a single piece; without the connecting elements, the device requires two components which can become separated during shipment or installation.

Figure 17B:
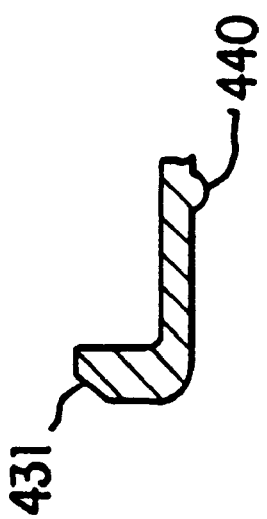
FIG. 17B is a sectional view of the clip portion of the embodiment shown in FIG. 17A showing a closeup of the retaining extensions.
Figure 17A:
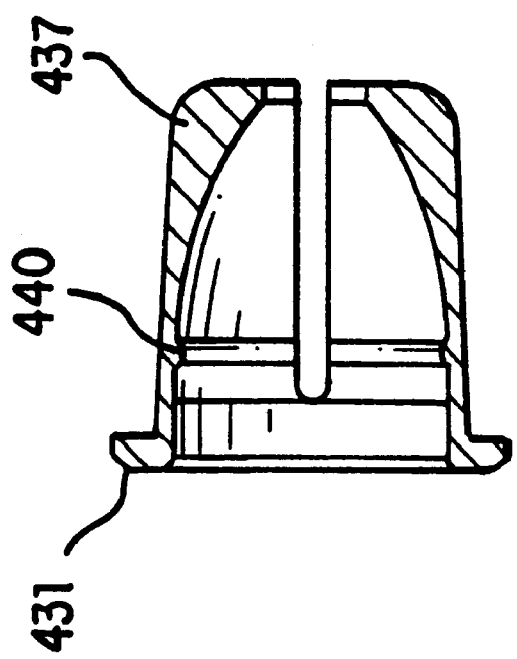
FIG. 17A is a sectional view showing an embodiment of the present invention in which the clip portion contains retaining extensions.

FIGS. 16, 17A, and 17B present another embodiment of the present invention with the additional feature of a sleeve member that includes a shoulder section that extends from the tubular portion of the sleeve at a point between the heed end and the flange of the sleeve. As shown in FIG. 16, the sleeve 20 contains an additional raised shoulder section 400, arranged such that as the clip member portion of the present invention (not shown in FIG. 16; see FIGS. 17A and 17B) is moved past head of the sleeve 22h toward the flange portion 21 of the sleeve 20, the shoulder 400 wedges the clip portion (not shown) against the surface of the hole (not shown), tightening the seating of the assembly in the hole, and thus reducing slippage between the installed assembly and the hole. This shoulder section 400 thus assures a tighter seating of the clip member (not shown) and sleeve 20 assembly into a hole (not shown) by providing a leverage point at the shoulder 400 for the clip member against the hole surface.

FIGS. 17A and 17B present another embodiment of the clip member portion of the present invention, for use with the sleeve with shoulder embodiment described in conjunction with FIG. 16. As shown in FIG. 17A, in this embodiment, near the base flange 431 of the clip member are retaining extensions 440. These retaining extensions 440 are short in comparison with the fingers 437 of the clip member. Thus, the head portion of the sleeve (not shown in FIG. 17A; see FIG. 16) can be pushed past the retaining extensions 440 with comparatively little effort. The retaining extensions 440 then serve to retain the clip member on the sleeve. FIG. 17B presents a closeup of a retaining extension 440.

Upon insertion of the clip and sleeve assembly into a retaining hole in a wall, in the embodiment of the present as described in FIGS. 16, 17A, and 17B, the retaining extensions pass the shoulder of the sleeve and serve to force the fingers outward against the interior surface of the hole. This feature greatly reduces any slip between the assembly and the hole.

Figure 18:
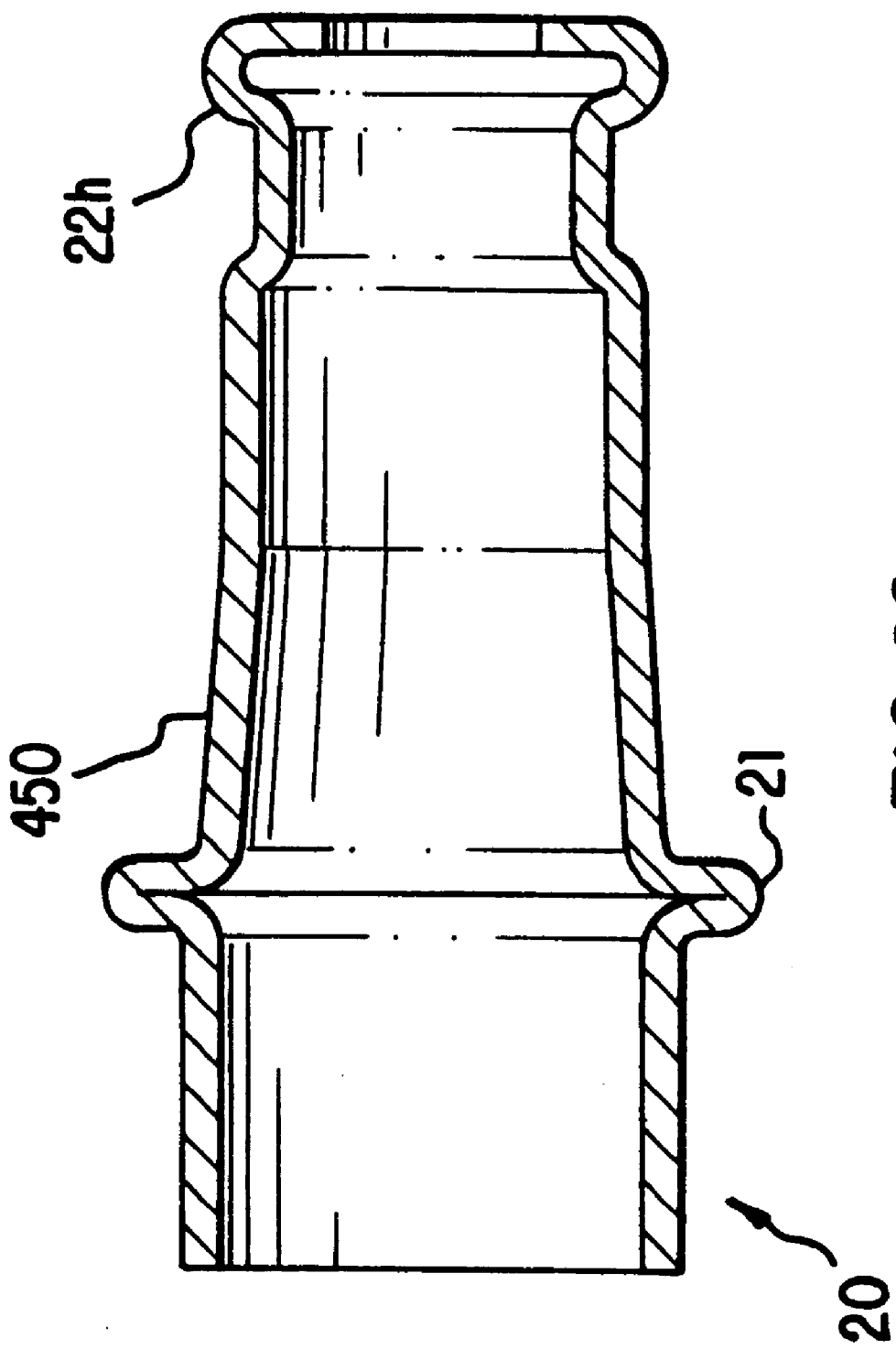
FIG. 18 is a sectional view showing an embodiment of the present invention in which the sleeve portion includes an inclined portion for the tubular section of the sleeve.

FIG. 18 presents another embodiment of the present invention, similar to that shown in FIG. 16, in which the sleeve member includes an inclined section of the tubular portion of the sleeve member between the head end and the flange of the sleeve. As shown in FIG. 18, an inclined tubular portion 450 is arranged such that as the clip member portion of the present invention (not shown; shown in FIGS. 17A and 17B) is moved past the head 22h of the sleeve 20 toward the flange portion 21 of the sleeve 20, the inclined portion 450 wedges the clip member portion against the surface of the hole (not shown) in which the assembly is inserted, tightening the seating of the assembly in the hole, and thus reducing slippage between the installed assembly and the hole.

While in accordance with the Patent Statutes, the preferred forms and embodiments of the invention have been illustrated and described, it will be apparent to those skilled in the art that other changes and modifications may be made without deviating from the inventive concepts set forth above.

What is claimed is:

1. An expanding lock control cable end fitting for anchoring a control cable in a hole formed in a support wall, said hole having a predetermined radial dimension, the end fitting comprising:

a sleeve that is secured to the control cable, the sleeve comprising a flange portion having a radial dimension that is greater than the radial dimension of the opening in the support wall;

the sleeve further comprising a cylindrical portion having a radially inner cylindrical wall and a radially outer cylindrical wall, the radial dimension of the radially outer cylindrical wall being less than the radial dimension of the opening in the support wall so that the cylindrical portion of the sleeve can be inserted into the opening in the support wall, the cylindrical portion having a predetermined axis, the cylindrical portion extending from the flange portion to a head portion formed in the cylindrical portion opposite the flange, the head portion comprising an annular portion having a predetermined outer diameter, the cylindrical portion having further including a recess portion located between the head end and the flange end of the cylindrical portion, and wherein the cylindrical portion of the sleeve further comprises a shoulder section between the flange and the head portion of the sleeve, the shoulder section having a radially inner cylindrical wall and a radially outer cylindrical wall;

a clip member, the clip member including a flange portion having a radially outer dimension that is greater than the dimension of the opening of the support wall, a cylindrical portion having a radially inner dimension and a radially outer dimension, the radially inner dimension of the cylindrical portion being large enough to allow the cylindrical portion of the clip to slide over the cylindrical portion of the sleeve and the radially outer dimension of the cylindrical portion of the clip member being small enough to allow the clip member to pass into the hole of the opening in the support wall;

the clip member further including an inclined portion having radially inner and outer surfaces, the radially inner surface of the inclined portion being inclined relative to the axis of the cylindrical portion of the sleeve such that when the head portion of the sleeve is moved toward the inclined portion, the end of the sleeve contacts the inclined portion of the clip member causing the clip member to expand; and wherein the inner surface of the clip member includes a cylindrical portion and an inclined portion and wherein the cylindrical portion of the inner surface of the clip member and the inclined portion of the inner surface of the clip member are split as to define at least two spaced fingers and wherein a retaining tab is provided between the spaced fingers.

2. The end fitting of claim 1, wherein the fingers are inclined at an angle of at least 30° relative to the axis of the cylindrical portion of the sleeve.

3. The end fitting of claim 2, wherein the fingers each has a length dimension parallel to the axis of the cylindrical portion of the sleeve and a width dimension parallel to the radial direction of the cylindrical portion of the sleeve, the length dimension and width dimensions such that the end fitting anchors securely in the opening in the support wall for a wide range of wall thicknesses.

4. The end fitting of claim 1, wherein the clip member further comprises at least one crush rib varying in dimension and inclined toward the flange portion from a dimension less than the radial dimension of the opening in the support wall to greater than the radial dimension of the opening in the support wall, such that the crush rib crushes when the clip member and sleeve are pushed into the opening in the support wall, the crushed crush rib forming a secure seating with the opening in the support wall.

5. The end fitting of claim 1, wherein the clip member comprises a plurality of retaining tabs and the retaining tabs extend radially outward.

6. The end fitting of claim 1, wherein the clip member is made of plastic.

7. The end fitting of claim 6, wherein the outer surface is substantially cylindrical.

8. The end fitting of claim 1, wherein the clip member is secured in the support member before installation.

9. The end fitting of claim 1, wherein the clip member includes tool receiving holes on the inclined fingers to facilitate disassembly.

10. The end fitting of claim 1, wherein the clip member includes a chamfer formed on the flange portion of the clip member to facilitate disassembly.

11. The end fitting of claim 1, wherein the control cable includes an outer conduit and the sleeve is secured to the control cable in a way that prevents any longitudinal movement between the sleeve and the outer conduit.

12. The end fitting of claim 1, wherein the radially outer cylindrical wall of the shoulder section being less than the radial dimension of the opening in the support wall so that the shoulder section can be inserted into the opening in the support wall and the radially outer cylindrical wall of the shoulder section exceeding the radial dimension of the radially outer cylindrical wall of the cylindrical portion of the sleeve.

13. The end fitting of claim 1, wherein the cylindrical portion of the sleeve further comprises an inclined portion between the flange portion and the head portion of the sleeve, the inclined portion of the sleeve having a radially inner cylindrical wall and a radially outer cylindrical wall, the inclined portion of the sleeve being inclined relative to the axis of the cylindrical portion of the sleeve, and the radial dimension of the radially outer cylindrical wall varying in dimension from the dimension of the radially outer cylindrical wall of the cylindrical portion of the sleeve to a dimension greater than the radially outer cylindrical wall of the cylindrical portion of the sleeve and less than the radial dimension of the opening in the support wall so that the inclined portion of the sleeve can be inserted into the opening in the support wall.

14. An expanding lock control cable end fitting for anchoring a control cable in a hole formed in a support wall, said hole having a predetermined radial dimension, the end fitting comprising:

a sleeve that is secured to the control cable, the sleeve comprising a flange portion having a radial dimension that is greater than the radial dimension of the opening in the support wall;

the sleeve further comprising a cylindrical portion having a radially inner cylindrical wall and a radially outer cylindrical wall, the radial dimension of the radially outer cylindrical wall being less than the radial dimension of the opening in the support wall so that the cylindrical portion of the sleeve can be inserted into the opening in the support wall, the cylindrical portion having a predetermined axis, the cylindrical portion extending from the flange portion to a head portion formed in the cylindrical portion opposite the flange, the head portion comprising an annular portion having a predetermined outer diameter, the cylindrical portion further including a recess portion located between the head end and the flange end of the cylindrical portion, and wherein the cylindrical portion of the sleeve further comprises a shoulder section between the flange and the head portion of the sleeve, the shoulder section having a radially inner cylindrical wall and a radially outer cylindrical wall;

a clip member, the clip member including a flange portion having a radially outer dimension that is greater than the dimension of the opening of the support wall, a cylindrical portion having a radially inner dimension and a radially outer dimension, the radially inner dimension of the cylindrical portion being large enough to allow the cylindrical portion of the clip to slide over the cylindrical portion of the sleeve and the radially outer dimension of the cylindrical portion of the clip member being small enough to allow the clip member to pass into the hole of the opening in the support wall;

the clip member further including an inclined portion having radially inner and outer surfaces, the radially inner surface of the inclined portion being inclined relative to the axis of the cylindrical portion of the sleeve such that when the head portion of the sleeve is moved toward the inclined portion, the end of the sleeve contacts the inclined portion of the clip member causing the clip member to expand; and wherein the clip member includes tool receiving holes on the fingers to facilitate disassembly.

15. An expanding lock control cable end fitting for anchoring a control cable in a hole formed in a support wall, said hole having a predetermined radial dimension, the end fitting comprising:

a sleeve that is secured to the control cable, the sleeve comprising a flange portion having a radial dimension that is greater than the radial dimension of the opening in the support wall;

the sleeve further comprising a cylindrical portion having a radially inner cylindrical wall and a radially outer cylindrical wall, the radial dimension of the radially outer cylindrical wall being less than the radial dimension of the opening in the support wall so that the cylindrical portion of the sleeve can be inserted into the opening in the support wall, the cylindrical portion having a predetermined axis, the cylindrical portion extending from the flange portion to a head portion formed in the cylindrical portion opposite the flange, the head portion comprising an annular portion having a predetermined outer diameter, the cylindrical portion further including a recess portion located between the head end and the flange end of the cylindrical portion, and wherein the cylindrical portion of the sleeve further comprises a shoulder section between the flange and the head portion of the sleeve, the shoulder section having a radially inner cylindrical wall and a radially outer cylindrical wall;

a clip member, the clip member including a flange portion having a radially outer dimension that is greater than the dimension of the opening of the support wall, a cylindrical portion having a radially inner dimension and a radially outer dimension, the radially inner dimension of the cylindrical portion being large enough to allow the cylindrical portion of the clip to slide over the cylindrical portion of the sleeve and the radially outer dimension of the cylindrical portion of the clip member being small enough to allow the clip member to pass into the hole of the opening in the support wall;

the clip member further including an inclined portion having radially inner and outer surfaces, the radially inner surface of the inclined portion being inclined relative to the axis of the cylindrical portion of the sleeve such that when the head portion of the sleeve is moved toward the inclined portion, the end of the sleeve contacts the inclined portion of the clip member causing the clip member to expand; and wherein the cylindrical portion of the sleeve further comprises an inclined portion between the flange portion and the head portion of the sleeve, the inclined portion of the sleeve having a radially inner cylindrical wall and a radially outer cylindrical wall, the inclined portion of the sleeve being inclined relative to the axis of the cylinder portion of the sleeve, and the radial dimension of the radially outer cylindrical wall varying in dimension from the dimension of the radially outer cylindrical wall of the cylindrical portion of the sleeve to a dimension greater than the radially outer cylindrical wall of the cylindrical portion of the sleeve and less than the radial dimension of the opening in the support wall so that the inclined portion of the sleeve can be inserted into the opening in the support wall.

* * * * *